United States Patent
Koike et al.

(10) Patent No.: US 12,435,290 B2
(45) Date of Patent: *Oct. 7, 2025

(54) MOLYBDENUM DISULFIDE PARTICLES AND LUBRICATING COMPOSITION

(71) Applicant: DIC Corporation, Tokyo (JP)

(72) Inventors: Akihiro Koike, Sakura (JP); Yusuke Kano, Sakura (JP)

(73) Assignee: DIC Corporation, Tokyo (JP)

( * ) Notice: Subject to any disclaimer, the term of this patent is extended or adjusted under 35 U.S.C. 154(b) by 74 days.

This patent is subject to a terminal disclaimer.

(21) Appl. No.: 18/281,612

(22) PCT Filed: Oct. 21, 2021

(86) PCT No.: PCT/JP2021/038979
§ 371 (c)(1),
(2) Date: Sep. 12, 2023

(87) PCT Pub. No.: WO2022/201610
PCT Pub. Date: Sep. 29, 2022

(65) Prior Publication Data
US 2024/0158714 A1    May 16, 2024

(30) Foreign Application Priority Data

Mar. 24, 2021  (JP) ................. 2021-050478

(51) Int. Cl.
*C10M 125/22*    (2006.01)
*C01G 39/06*    (2006.01)
(Continued)

(52) U.S. Cl.
CPC ........... *C10M 125/22* (2013.01); *C01G 39/06* (2013.01); *C10M 139/00* (2013.01);
(Continued)

(58) Field of Classification Search
CPC .............. C10M 125/22; C10M 139/00; C10M 141/12; C10M 169/04; C10M 171/06;
(Continued)

(56) References Cited

U.S. PATENT DOCUMENTS 3,647,689 A * 3/1972 Groszek .................. C01G 1/12
508/108
2006/0079410 A1 * 4/2006 Yadav ..................... B22F 1/056
508/165

(Continued)

FOREIGN PATENT DOCUMENTS

CN    103086436 A    5/2013
JP    2013-144758 A    7/2013
(Continued)

OTHER PUBLICATIONS

Dukhovskoi et al. "Lubricant Properties of Molybdenum Disulfide Diffusion Coatings with Various Crystalline Structures", Soviet materials science: a translation of Fiziko-khimicheskaya mekhanika materialov, 1975, 10, 44-46 (Year: 1975).*

(Continued)

*Primary Examiner* — Latosha Hines
(74) *Attorney, Agent, or Firm* — Troutman Pepper Locke LLP

(57) ABSTRACT

Molybdenum disulfide particles include a 2H crystal structure and a 3R crystal structure of molybdenum disulfide, in which a presence ratio of the 3R crystal structure in a crystal phase of molybdenum disulfide is 10% or more, and a crystallite size of the 3R crystal structure calculated by extended-type Rietveld analysis based on an analysis formula $L=K\lambda/(\beta \cos \theta)$ using a profile obtained from powder X-ray diffraction (XRD) using Cu-Kα rays as an X-ray source is 1 nm or more and 150 nm or less (in the above formula, K is an instrumental constant that depends on an XRD optical system (an incident side and a detector side)

(Continued)

and settings, L is a crystallite size [m], $\lambda$ is a measured X-ray wavelength [m], $\beta$ is a half width [rad], and $\theta$ is a Bragg angle of a diffraction line [rad]).

14 Claims, 10 Drawing Sheets

(51) Int. Cl.
*C10M 139/00* (2006.01)
*C10M 141/12* (2006.01)
*C10M 169/04* (2006.01)
*C10N 20/06* (2006.01)

(52) U.S. Cl.
CPC ........ *C10M 141/12* (2013.01); *C10M 169/04* (2013.01); *C01P 2002/60* (2013.01); *C01P 2002/72* (2013.01); *C01P 2002/74* (2013.01); *C01P 2002/76* (2013.01); *C01P 2004/61* (2013.01); *C01P 2004/62* (2013.01); *C01P 2004/64* (2013.01); *C01P 2006/12* (2013.01); *C10M 2201/066* (2013.01); *C10M 2203/003* (2013.01); *C10N 2020/06* (2013.01)

(58) Field of Classification Search
CPC ...... C10M 2201/066; C10M 2203/003; C10M 2219/068; C10M 101/02; C10M 2227/09; C10N 2010/12; C10N 2020/06; C10N 2030/06; C01G 39/06; C01P 2002/60; C01P 2002/72; C01P 2002/74; C01P 2002/76; C01P 2004/61; C01P 2004/62; C01P 2004/64; C01P 2006/12; C01P 2002/70

See application file for complete search history.

(56) References Cited

U.S. PATENT DOCUMENTS

| | | | |
|---|---|---|---|
| 2012/0149611 A1* | 6/2012 | Yamaguchi | C09D 175/04 |
| | | | 508/202 |
| 2014/0212587 A1 | 7/2014 | Malshe | |

FOREIGN PATENT DOCUMENTS

| | | |
|---|---|---|
| JP | 2017-115920 A | 6/2017 |
| JP | 6614471 B1 | 12/2019 |
| WO | 01/94504 A2 | 12/2001 |

OTHER PUBLICATIONS

Leidich, Saskia et al., ""Non-hydrolytic" sol-gel synthesis of molybdenum sulfides", Journal of Solid State Chemistry, vol. 242, Feb. 16, 2016, pp. 175-181. (cited in the Jul. 1, 2025 EESR).

Goloveshkin, Alexander S. et al., "Structural Properties and Phase Transition of Exfoliated-Restacked Molybdenum Disulfide", The Journal of Physical Chemistry, vol. 117, No. 16, Apr. 10, 2013, pp. 8509-8515. (cited in the Jul. 1, 2025 EESR).

* cited by examiner

MOLYBDENUM DISULFIDE PARTICLES AND LUBRICATING COMPOSITION

TECHNICAL FIELD

The present invention relates to molybdenum disulfide particles and a lubricating composition.

The present application claims priority based on Japanese Patent Application No. 2021-050478 filed in Japan on Mar. 24, 2021, and the content thereof is incorporated herein.

BACKGROUND ART

Molybdenum disulfide has been known as a lubricant for reduction in friction and wear in the automotive and other industries and is particularly used as liquid-base lubricants such as engine oils in various countries.

Molybdenum sulfides represented by molybdenum disulfide ($MoS_2$) have been known in application as, for example, lubricants included in solid sliding members and greases (see PTL 1 to PTL 3).

Inexpensive powders made by grinding natural molybdenum disulfide minerals have micrometer order sizes and a specific gravity of about 5, which is extremely high, and thus have a disadvantage of a small effect per added weight.

In addition, molybdenum disulfide generally used for the lubricant is a hexagonal crystal solid lubricant material and has been known to have 2H (hexagonal crystal) alone as a crystal structure.

CITATION LIST

Patent Literature

PTL 1: JP-A-2017-115920
PTL 2: JP-A-2013-144758
PTL 3: JP-B-6614471

SUMMARY OF INVENTION

Technical Problem

Nanometer-sized molybdenum disulfide particles, which are a proprietary developed product of the present applicant, have not only 2H as the crystal structure of the particles but also an unusual 3R (rhombohedral crystal) structure. According to this technology, molybdenum disulfide particles are produced using a technology "nanometer-sized molybdenum trioxide fine particles" that the present applicant possesses as a raw material, whereby "molybdenum disulfide having the 3R structure and light weight properties advantageous for forming nanometer-sized particles and a large surface area", which is difficult to achieve by grinding mine products or synthesizing from general-purpose molybdenum trioxide, can be synthesized.

However, for this nanometer-sized molybdenum disulfide, an actual half width is significantly larger than the half width of an XRD peak predicted from the particle diameter, and thus crystal states, that is, a crystallite size and a presence ratio of the 2H crystal structure and the 3R crystal structure have not been quantified yet. Therefore, problems of difficulty in figuring out whether the crystallite size and the presence ratio vary under different production conditions, and furthermore, whether this affects the friction properties in the application evaluation arise.

An object of the present invention is to provide molybdenum disulfide particles and a lubricating composition that have an appropriate particle size and crystallite size and can improve friction properties.

Solution to Problem

As a result of further analysis by paying attention to heating conditions at the time of production of the molybdenum disulfide particles, the inventors of the present invention have found that (1) XRD peak intensity and the half width vary due to change in heating conditions and thus variations in the crystallite size and the degree of crystallinity of the 2H crystal structure and the 3R crystal structure based on this change can be quantified, (2) the ratio of the 2H crystal structure and the 3R crystal structure varies due to the same heating conditions and the ratio can be quantified using Rietveld analysis software (High Score Plus, manufactured by Malvern Panalytical Ltd.), which can take the crystallite size into consideration, and as a result, (3) a friction coefficient varies in a friction test in an oil dispersion system and thus friction properties can be improved by quantifying the friction coefficient.

The inventors of the present invention have also found that, as a result of the extended-type Rietveld analysis, the case where the 2H crystal structure of the molybdenum disulfide particles is constituted of a single crystal phase having relatively small crystallite size and the case where the 2H crystal structure is constituted of a crystal phase (first crystal phase) having a larger crystallite size than that of the single crystal phase and a low crystal phase (second crystal phase) having a smaller crystallite size than that of the single crystal phase are present depending on the heating conditions.

In other words, the present invention provides the following constitutions.

[1] Molybdenum disulfide particles comprising:
a 2H crystal structure and a 3R crystal structure of molybdenum disulfide, in which
a presence ratio of the 3R crystal structure in a crystal phase of molybdenum disulfide is 10% or more, and
a crystallite size of the 3R crystal structure calculated by extended-type Rietveld analysis based on an analysis formula $L=K\lambda/(\beta \cos \theta)$ using a profile obtained from powder X-ray diffraction (XRD) using Cu-Kα rays as an X-ray source is 1 nm or more and 150 nm or less
(in the above formula, K is an instrumental constant that depends on an XRD optical system (an incident side and a detector side) and settings, L is a crystallite size [m], $\lambda$ is a measured X-ray wavelength [m], $\beta$ is a half width [rad], and $\theta$ is a Bragg angle of a diffraction line [rad]).

[2] The molybdenum disulfide particles according to [1], in which the 3R crystal structure obtained by the extended-type Rietveld analysis is formed of a crystal phase constituted of crystallites having a crystallite size calculated in accordance with the analysis formula of 5 nm or more and 50 nm or less.

[3] The molybdenum disulfide particles according to [1], in which
the 2H crystal structure obtained by the extended-type Rietveld analysis is formed of a single crystal phase constituted of crystallites having a predetermined crystallite size calculated in accordance with the analysis formula, and
the crystallite size of the crystal phase of the 2H crystal structure is 1 nm or more and 20 nm or less.

[4] The molybdenum disulfide particles according to [3], in which a presence ratio of the 2H crystal structure and the 3R crystal structure in the crystal phase obtained by the extended-type Rietveld analysis using the profile obtained from the XRD is 10:90 to 90:10.

[5] The molybdenum disulfide particles according to [1], in which
the 2H crystal structure obtained by the extended-type Rietveld analysis is formed of a first crystal phase constituted of crystallites having a predetermined crystallite size calculated in accordance with the analysis formula and a second crystal phase having a smaller crystallite size than that of the first crystal phase, and
the crystallite size of the second crystal phase of the 2H crystal structure is 1 nm or more and 20 nm or less.

[6] The molybdenum disulfide particles according to [5], in which a presence ratio of the first crystal phase of the 2H crystal structure, the 3R crystal structure, and the second crystal phase of the 2H crystal structure in the crystal phase obtained by the extended-type Rietveld analysis using the profile obtained from the XRD is 30 to 10:10 to 70:80 to 15.

[7] The molybdenum disulfide particles according to any one of [1] to [6], in which
the molybdenum disulfide particles comprise an amorphous phase, and
a presence ratio of the amorphous phase of the molybdenum disulfide particles is 5% or more.

[8] The molybdenum disulfide particles according to any one of [1] to [7], in which in a radial distribution function obtained from an extended X-ray absorption fine structure (EXAFS) profile of a K absorption edge of molybdenum, a ratio (I/II) of peak intensity I caused by Mo—S to peak intensity II caused by Mo—Mo is larger than 1.0.

[9] The molybdenum disulfide particles according to any one of [1] to [8], in which a median diameter $D_{50}$ of the molybdenum disulfide particles determined by a dynamic light scattering method is 10 nm or more and 1,000 nm or less.

[10] The molybdenum disulfide particles according to any one of claims 1 to 9, in which a specific surface area of the molybdenum disulfide particles is 10 $m^2/g$ or more measured by a BET method.

[11] A lubricating composition comprising:
the molybdenum disulfide particles according to any of [1] to [10];
base oil constituted of one or more of mineral oil, synthetic oil, and partially synthetic oil; and an additive such as a dispersing agent.

[12] The lubricating composition according to [11], in which the lubricating composition comprises 0.0001% by mass or more and 10% by mass or less of the molybdenum disulfide particles with respect to 100% by mass of a total mass of the lubricating composition.

[13] The lubricating composition according to [11] or [12], further comprising organometallic complex particles.

[14] The lubricating composition according to [13], in which the lubricating composition comprises 0.0001% by mass or more and 10% by mass or less of the organometallic complex particles with respect to 100% by mass of a total mass of the lubricating composition.

Advantageous Effects of Invention

According to the present invention, molybdenum disulfide particles and a lubricating composition that have an appropriate particle size and crystallite size and can improve friction properties can be provided.

DESCRIPTION OF EMBODIMENTS

Figure 1:
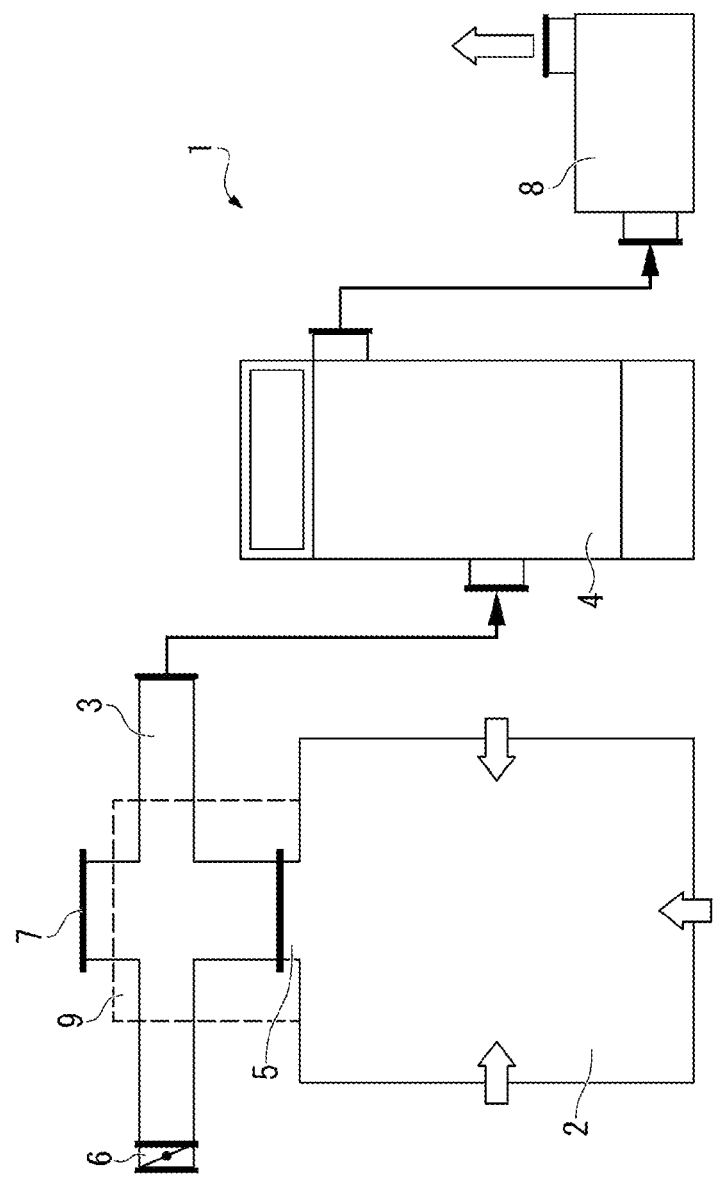
FIG. 1 is a schematic view illustrating one example of an apparatus used for production of molybdenum trioxide particles serving as a raw material of the molybdenum disulfide particles according to the present embodiment.

Hereinafter, the embodiments of the present invention will be described in detail with reference to the drawings.

<Molybdenum Disulfide Particles>

The molybdenum disulfide particles according to the present embodiment include a 2H crystal structure and a 3R crystal structure of molybdenum disulfide, in which a presence ratio of the 3R crystal structure in the crystal phase of molybdenum disulfide is 10% or more, and a crystallite size of the 3R crystal structure calculated by extended-type Rietveld analysis based on an analysis formula $L=K\lambda/(\beta \cos \theta)$ using a profile obtained from powder X-ray diffraction (XRD) using Cu-Kα rays as an X-ray source is 1 nm or more and 150 nm or less. In the above formula, K is an instrumental constant that depends on an XRD optical system (an incident side and a detector side) and settings, L is a crystallite size [m], λ is a measured X-ray wavelength [m], K is a constant, β is a half width [rad], and θ is a Bragg angle of a diffraction line [rad].

The molybdenum disulfide ($MoS_2$) particles according to the present embodiment include the 2H crystal structure and the 3R crystal structure. Molybdenum disulfide generally used as a lubricant is hexagonal solid lubricant materials and almost all of them have the 2H crystal structure as the crystal structure (see FIG. 6). When the molybdenum disulfide particles having a presence ratio of the 3R crystal structure in the crystal phase of molybdenum disulfide of 10% or more are used as a lubricant, the lubricant not only reduces seizure even under high loads but also has excellent friction properties that reduce the friction coefficient by 20% to 30%. The presence ratio of the 3R crystal structure in the crystal phase of molybdenum disulfide may be 5% or more and 60% or less, 20% or more and 60% or less, preferably 20% or more and 60% or less, and 20% or more and 45% or less.

That the molybdenum disulfide particles have the 2H crystal structure and the 3R crystal structure can be found by, for example, using extended-type Rietveld analysis software (High Score Plus, manufactured by Malvern Panalytical Ltd.), which can take the crystallite size into consideration. This Rietveld analysis software can calculate the crystallite size in addition to crystal structure types and the ratio thereof that are calculated by common Rietveld analysis by simulating the entire diffraction profile of XRD using a crystal structure model including the crystallite size, comparing this profile to the diffraction profile of XRD obtained from experiments, optimizing the crystal lattice constant of the crystal structure model, crystal structure factors such as atomic coordinates, weight fractions (presence ratios), and the like with a least-square method so as to minimize the residue between the diffraction profile obtained from the experiment and the diffraction profile obtained by the calculation, and identifying and quantifying each phase of the 2H crystal structure and the 3R crystal structure with high precision. Hereafter, in the present patent, the above analysis method using High Score Plus will be referred to as "extended-type Rietveld analysis".

The median diameter $D_{50}$ of the molybdenum disulfide particles in the present embodiment is preferably 10 nm or more and 1,000 nm or less.

Commercially available $MoS_2$ is crushed ore products, includes many particles having a size larger than 1 μm in a particle diameter, and has a small effect of a lubricant per weight. Therefore, in a lubricating composition containing a base oil having a small viscosity, the commercially available $MoS_2$ acts as a cause of sedimentation. On the other hand, when the molybdenum disulfide particles are used as the lubricant, seizure is less likely to occur even when high load is applied because the molybdenum disulfide particles have a median diameter $D_{50}$ of 1,000 nm or less as described in the present embodiment. This is because when the friction surfaces of the materials to be slid approach each other to a distance of less than 1 μm (that is, 1,000 nm) under high load, the lubricant is not eliminated from this clearance to remain and can maintain lubricating performance. The molybdenum disulfide particles having a median diameter $D_{50}$ of 1,000 nm or less provide excellent storage stability due to difficulty in causing sedimentation when used in the lubricating composition containing the base oil.

The molybdenum disulfide particles having a median diameter $D_{50}$ of 1,000 nm or less are less likely to cause sedimentation because the molybdenum disulfide particles become floating components, and thus even if the friction surfaces of the materials to be slid are arranged vertically or close to verticalness, which is in a state of easily being affected by gravity, the lubricant can be present in a state where the lubricant has already penetrated into the clearance between the friction surfaces before sliding. The molybdenum disulfide particles also have an effect of reducing the friction coefficient between contacting surfaces by causing slippage between crystal surfaces when molybdenum disulfide penetrates into the clearance and is subjected to shear force that is characteristic of layered compounds. Therefore, it is conceivable that compared to conventional molybdenum disulfide particles, which tend to cause sedimentation easily, the molybdenum disulfide particles can prevent the scraping, wear, and the like of members to be slid at the start of sliding, and as a result, can contribute to extending the life of the friction surfaces of the materials to be slid.

The molybdenum disulfide particles according to the present embodiment can be supplied as a lubricant, for example, to the sliding parts of a plurality of metal balls. In this case, when the metal balls are pressed against each other until a distance between the metal balls is less than 1 μm (=1,000 nm) under high load, the median diameter $D_{50}$ is as small as 1,000 nm or less, and thus the lubricant is not excluded from the clearance between the metal balls and can remain in the clearance. Even in this situation, it is conceivable that when the molybdenum disulfide particles are subjected to shear force, which is characteristic of layered compounds, slippage occurs between crystal surfaces to generate a friction coefficient reduction effect between contacting surfaces, and the probability (or contact area×time) of contact between friction surfaces of the metal balls remains low, and thus seizure due to rubbing is less likely to occur.

From the viewpoint of the effect described above, the median diameter $D_{50}$ of the molybdenum disulfide particles is preferably 600 nm or less, more preferably 500 nm or less, and still more preferably 400 nm or less. The median diameter $D_{50}$ of the molybdenum disulfide particles may be 20 nm or more or may be 40 nm or more. The median diameter $D_{50}$ of the molybdenum disulfide particles is measured using, for example, a dynamic light scattering-type particle diameter distribution analyzer (Nanotrac Wave II manufactured by MicrotracBEL Corp.) or a laser diffraction-type particle size distribution analyzer (SALD-7000 manufactured by Shimadzu Corporation).

In the molybdenum disulfide particles according to the present embodiment, the crystallite size of the 3R crystal structure is 1 nm or more and 150 nm or less. The molybdenum disulfide particles having a crystallite size of the 3R crystal structure of 1 nm or more and 150 nm or less allow the friction properties to be improved because as the crystallite size becomes smaller, the sliding between layers more easily occurs at the time of being subjected to the shear force when the lubricant penetrates into the clearance, and thus the friction coefficient of the dispersion system to be reduced when the molybdenum disulfide particles are used as a dispersion agent contained in the base oil such as a lubricating oil. The crystallite size of the 3R crystal structure is preferably a value obtained by the extended-type Rietveld analysis. The friction coefficient can be measured, for example, from a Stribeck curve using a Ball-on-Disk tester or a Four Ball tester.

From the viewpoint of the effect described above, the 3R crystal structure obtained by the extended-type Rietveld analysis is preferably formed of a crystal phase constituted of crystallites of which crystallite size obtained in accordance with the above analysis formula is 1 nm or more and 50 nm or less. The crystallite size is more preferably 5 nm or more and 50 nm or less and still more preferably 10 nm or more and 40 nm or less.

In the molybdenum disulfide particles according to the present embodiment, the crystallite size of the 2H crystal structure is preferably 1 nm or more and 150 nm or less. The molybdenum disulfide particles having a crystallite size of the 2H crystal structure of 1 nm or more and 150 nm or less allow the friction coefficient of the dispersion system to be reduced when used as the dispersion agent contained in the base oil such as the lubricating oil and thus the friction properties to be improved.

The crystallite size of the 2H crystal structure is preferably a value obtained in accordance with the extended-type Rietveld analysis. The 2H crystal structure obtained by the Rietveld analysis is preferably a crystal phase constituted of crystallites of which crystallite size obtained in accordance with the above analysis formula is 1 nm or more and 150 nm or less and the crystallite size is more preferably 5 nm or more and 150 nm or less.

The 2H crystal structure obtained by the extended-type Rietveld analysis is preferably formed of a single crystal phase constituted of crystallites having a predetermined crystallite size. In the production method described below, the 2H crystal structure constituted of a single crystal phase can be obtained by setting the heating temperature at the heat treatment to a relatively low temperature. In this case, the crystallite size of the 2H crystal structure is more preferably 1 nm or more and 20 nm or less and preferably 5 nm or more and 15 nm or less.

The crystallite size of the 2H crystal structure and the crystallite size of the 3R crystal structure can also be calculated using, for example, the peak half width of the XRD diffraction profile.

The presence ratio (2H:3R) of the 2H crystal structure and the 3R crystal structure in the crystal phase obtained by the extended-type Rietveld analysis using the profile obtained from the above XRD is preferably 10:90 to 90:10. The molybdenum disulfide particles having a presence ratio of the 3R crystal structure in the crystal phase of 10% or more and 90% or less allow the seizure to be less likely to occur at the time of applying high load and the friction coefficient to be reduced by 20% to 30% when the molybdenum disulfide particles are used as the lubricant.

From the viewpoint of the effect described above, the presence ratio (2H:3R) of the 2H crystal structure and the 3R crystal structure obtained by the extended-type Rietveld analysis using the profile obtained from the above XRD is more preferably 10:90 to 80:20 and still more preferably 40:60 to 80:20.

The 2H crystal structure obtained by the extended-type Rietveld analysis may be formed of a crystal phase first crystal phase constituted of crystallite having a predetermined crystallite size and a second crystal phase of which crystallite size is smaller than that of the first crystal phase. In the production method described later, the 2H crystal structure constituted of the first crystal phase and the second crystal phase can be obtained by further heating the molybdenum disulfide particles as post-treatment. The crystallite size of the first crystal phase of the 2H crystal structure is, for example, larger than 20 nm and 150 nm or less, and may be 50 nm or more and 150 nm or less, or 100 nm or more and 150 nm or less. However, in order to reduce the friction coefficient, it is preferable that the first crystal phase be not present in the crystal phase of the 2H crystal structure, or the presence ratio of the first crystal phase be smaller. Further, the crystallite size of the second crystal phase of the 2H crystal structure is preferably 1 nm or more and 20 nm or less, and may be 1 nm or more and 10 nm or less or 5 nm or more and 15 nm or less.

Similar to the above description, the crystallite size of the first crystal phase of the 2H crystal structure, the crystallite size of the 3R crystal structure, and the crystallite size of the second crystal phase of the 2H crystal structure can also be calculated using, for example, the peak half width of the XRD diffraction profile.

The presence ratio (2H (first crystal phase):3R:2H (second crystal phase)) of the first crystal phase of the 2H crystal structure, the 3R crystal structure, and the second crystal phase of the 2H crystal structure in the crystal phase obtained by the extended-type Rietveld analysis using the profile obtained from the above XRD is preferably 30 to 0:10 to 70:80 to 15. The molybdenum disulfide particles having a presence ratio of the first crystal phase of the 2H crystal structure, the 3R crystal structure, and the second crystal phase of the 2H crystal structure in the crystal phase of 30 to 10:10 to 70:80 to 15 allow the seizure to be less likely to occur at the time of applying high load and the friction coefficient to be reduced by 20% to 30% when the molybdenum disulfide particles are used as the lubricant.

Form the viewpoint of the effect described above, the presence ratio of the first crystal phase of the 2H crystal structure, the 3R crystal structure, and the second crystal phase of the 2H crystal structure obtained by the extended-type Rietveld analysis using the profile obtained from the above XRD is more preferably 30 to 0:10 to 70:80 to 15 and still more preferably 25 to 0:20 to 60:75 to 20.

In the profile of the molybdenum disulfide particles obtained from the powder X-ray diffraction (XRD) using Cu-Kα rays as an X-ray source, a peak in the vicinity of 39.5° and a peak in the vicinity of 49.5° are preferably derived from the 2H crystal structure, a peak in the vicinity of 32.5°, a peak in the vicinity of 39.5°, and a peak in the vicinity of 49.5° are preferably derived from the 3R crystal structure, and half widths of the peak in the vicinity of 39.5° and the peak in the vicinity of 49.5° are preferably 1° or more. Furthermore, the molybdenum disulfide particles may include a crystal structure such as a 1H crystal structure in addition to the 2H crystal structure and the 3R crystal structure of molybdenum disulfide.

That the molybdenum disulfide particles include the 3R crystal structure, which is a metastable structure, can be distinguished by forming the peak in the vicinity of 39.5° and the peak in the vicinity of 49.5° together from a synthesized peak of the 2H crystal structure and the 3R crystal structure in the profile obtained from the powder X-ray diffraction (XRD) using Cu-Kα rays as the X-ray source.

In practice, the presence ratio of the 2H crystal structure is determined by the peak in the vicinity of 39.5° and the broad peak in the vicinity of 49.5° using the profile obtained from the above powder X-ray diffraction (XRD). The difference between the peak in the vicinity of 39.5° and the broad peak in the vicinity of 49.5° is optimized by two peaks in the vicinity of 32.5° and two peaks in the vicinity of 39.5° to determine the presence ratio of the 3R crystal structure. That is, both of the peak in the vicinity of 39.5° and the peak in the vicinity of 49.5° are synthetic waves originated from the 2H crystal structure and the 3R crystal structure and the presence ratio of the 2H crystal structure and the 3R crystal structure in the molybdenum disulfide particles can be calculated from these synthetic waves.

The molybdenum disulfide particles may also include an amorphous phase. The presence ratio of the amorphous phase in the molybdenum disulfide particles is represented by 100(%)−(degree of crystallinity (%)), and is preferably 5% or more, more preferably 15% or more, and still more preferably 20% or more. The molybdenum disulfide particles having a presence ratio of the amorphous phase of 5% or more allow the friction coefficient to be further reduced and the friction properties to be further improved.

The primary particles of the molybdenum disulfide particles in a two-dimensional image when the molybdenum disulfide particles are photographed with a transmission electron microscope (TEM) may have a particle shape, a spherical shape, a plate shape, a needle shape, a string shape, a ribbon shape, or a sheet shape or may have a combination of these shapes. The molybdenum sulfide preferably has a disk shape, the ribbon shape, or the sheet shape. The shape of 50 primary particles of the molybdenum sulfide preferably has a size in the range of length (vertical)×width (transverse)×thickness (height)=50 nm to 1,000 nm×50 nm to 1,000 nm×3 nm to 100 nm, more preferably a size in the range of 100 nm to 500 nm×100 nm to 500 nm×5 nm to 50 nm, and particularly preferably a size in the range of 50 nm to 200 nm×50 nm to 200 nm×5 nm to 20 nm on average. The disk shape, the ribbon shape, or the sheet shape allow the specific surface area of the molybdenum disulfide particles to increase. Here, the disc shape, the ribbon shape, or the sheet shape means a thin layer shape. The aspect ratio of the primary particles of the molybdenum sulfide, that is, a value of (Length (longitudinal and transverse size))/thickness (height)) is preferably 1.2 to 1,200, more preferably 2 to 800, still more preferably 5 to 400, and particularly preferably 10 to 200 on average of 50 particles.

It is conceivable that the shape of the primary particles of the molybdenum disulfide particles is not a simple spherical shape but is the disk shape, the ribbon shape, or the sheet shape having a large aspect ratio, whereby it is expected that the molybdenum disulfide particles more efficiently cover the friction surfaces of the materials to be slid that are about to come into contact with each other and the interlayer slippage of the crystal structure occurs and the probability (or contact area×time) of contact between the friction surfaces of the materials to be slid is reduced and thus wear and seizure caused by rubbing to each other are less likely to occur.

The specific surface area of the molybdenum disulfide particles measured by a BET method is preferably 10 m$^2$/g or more, more preferably 30 m$^2$/g or more, and particularly preferably 40 m$^2$/g or more. The specific surface area of the molybdenum disulfide particles measured by the BET method may be 300 m$^2$/g or less or 200 m$^2$/g or less.

In the primary particles of the molybdenum disulfide particles, layers can be easily shifted from each other by external forces such as friction because each layer constituting the primary particles is approached by relatively weak interaction. Therefore, when the primary particles of the molybdenum disulfide particles are interposed between metals serving as the materials to be slid, the layers constituting the primary particles are shifted from each other by the friction force to reduce an apparent friction coefficient and contact between the metals serving as the materials to be slid can also be prevented.

It is conceivable that the molybdenum disulfide particles having a specific surface area measured by the BET method of 10 m$^2$/g or more contribute to both improvement in the performance of the lubricant and prevention of the seizure because when the primary particles are present between the metals serving as the materials to be slid, the area where the metals serving as the materials to be slid come into contact with each other can decrease more.

In the radial distribution function of the molybdenum disulfide particles obtained from an extended X-ray absorption fine structure (EXAFS) profile of the K absorption edge of molybdenum, a ratio (I/II) of peak intensity I caused by Mo—S to peak intensity II caused by Mo—Mo is preferably 1.0 or more, more preferably 1.1 or more, and particularly preferably 1.2 or more.

In the crystal structure of molybdenum disulfide, the distance between Mo and S is almost the same in the 2H crystal structure and the 3R crystal structure due to a covalent bond, so that the peak intensity caused by Mo—S is the same in the 2H crystal structure and the 3R crystal structure in the extended X-ray absorption fine structure (EXAFS) profile of the K absorption edge of molybdenum. On the other hand, since the 2H crystal structure of molybdenum disulfide is the hexagonal crystal, the hexagon is located 90° directly below the same hexagon of Mo atoms, and thus the distance between Mo and Mo is shorter, and the peak intensity II caused by Mo—Mo is stronger.

Conversely, since the 3R crystal structure of molybdenum disulfide is the rhombohedral crystal, the hexagon is present not 90° directly below the hexagon but shifted by half of the hexagon, and thus the distance between Mo and Mo becomes larger and the peak intensity II caused by Mo—Mo is weaker.

The ratio (I/II) decreases in the pure 2H crystal structure of molybdenum disulfide, while the ratio (I/II) increases as the 3R crystal structure is contained more.

In the 3R crystal structure, the hexagons of the Mo atoms in each of the three layers are shifted from each other by half of the hexagon, and thus the interaction between layers is expected to be smaller and each layer is more easily slipped than in the 2H crystal structure, in which the hexagons of Mo atoms in two layers are regularly arranged vertically.

In the 2H crystal structure, it can be expected that a smaller crystallite size facilitates the occurrence of slippage on the contact surface.

The conversion ratio Rc of the molybdenum trioxide particles to MoS$_2$ is preferably 70% or more, more preferably 80% or more, and still more preferably 90% or more because the presence of molybdenum trioxide is considered to adversely affect lubrication performance.

The molybdenum disulfide particles exhibit lubricating performance due to heating by friction by indicating a digit of the conversion ratio Rc to MoS$_2$ close to 100% and can provide superior lubrication properties to other molybdenum disulfide materials with which molybdenum trioxide may be produced as a by-product or in which molybdenum trioxide may be contained, and a precursor thereof.

The conversion ratio Rc of the molybdenum trioxide particles to MoS$_2$ can be determined from the profile data obtained by X-ray diffraction (XRD) measurement of the molybdenum disulfide particles by a RIR (reference intensity ratio) method. The conversion ratio $R_C$ to MoS$_2$ can be obtained from the following formula (1) using a RIR value $K_A$ of molybdenum disulfide (MoS$_2$) and an integrated intensity $I_A$ of the peak in the vicinity of 2θ=14.4°±0.5° attributed to the (002) plane or the (003) plane of molybdenum disulfide (MoS$_2$), and a RIR value $K_B$ of each molybdenum oxide (for example, MoO$_3$ as a raw material and Mo$_9$O$_{25}$, Mo$_4$O$_{11}$, and MoO$_2$ as reaction intermediates) and an integrated intensity $I_B$ of each molybdenum oxide (MoO$_3$ as a raw material, and Mo$_9$O$_{25}$, Mo$_4$O$_{11}$, and MoO$_2$ as reaction intermediates).

$$R_C(\%)=(I_A/K_A)/(\Sigma(I_B/K_B))\times 100 \quad (1)$$

Here, the values described in the inorganic crystal structure database (ICSD) (produced by Japan Association for International Chemical Information) can be used as the RIR values and integrated powder X-ray diffraction software (PDXL2) (manufactured by Rigaku Corporation) can be used for analysis.

The lubricating composition according to the present embodiment preferably includes the molybdenum disulfide particles ($MoS_2$), but are not limited thereto. The composition may also contain molybdenum sulfide particles represented by $MoS_x$ (X=1 to 3) or one or more kinds of molybdenum sulfide particles represented by $MoS_x$ (X=1 to 3) may also be contained.

<Method for Producing Molybdenum Disulfide Particles>

The molybdenum disulfide particles can be produced, for example, by heating molybdenum trioxide particles having an average particle diameter of the primary particles of 2 nm or more and 1,000 nm or less in the presence of a sulfur source at a temperature of 200° C. to 1,000° C.

The average particle diameter of the primary particles of the molybdenum trioxide particles refers to an average value of the primary particle diameters of randomly selected 50 primary particles when the molybdenum trioxide particles are photographed with a scanning electron microscope (SEM) or a transmission electron microscope (TEM), the major axis (the Feret diameter of the longest portion observed) and the minor axis (the short Feret diameter in a direction perpendicular to the Feret diameter of the longest portion) of the minimum unit particles (that is, the primary particles) constituting aggregates on a two-dimensional image are measured, and an average value thereof is defined as the primary particle diameter.

In the method for producing molybdenum disulfide particles, the average particle diameter of the primary particles of the molybdenum trioxide particles is preferably 1 µm or less. From the viewpoint of the reactivity with sulfur, the average particle diameter is more preferably 600 nm or less, still more preferably 400 nm or less, and particularly preferably 200 nm or less. The average particle diameter of the primary particles of the molybdenum trioxide particles may be 2 nm or more, 5 nm or more, or 10 nm or more.

The molybdenum oxide particles used for producing the molybdenum disulfide particles are preferably made of an aggregate of primary particles containing molybdenum trioxide having a β crystal structure. Since the molybdenum trioxide particles have better reactivity with sulfur than conventional molybdenum trioxide particles having only α crystals as a crystal structure, and contain molybdenum trioxide having the β crystal structure, the conversion rate $R_C$ to $MoS_2$ can increase in a reaction with the sulfur source.

The β crystal structure of molybdenum trioxide can be observed by the presence of a peak (in the vicinity of 2θ:23.01°, No. 86426 (inorganic crystal structure database (ICSD)) attributed to the plane (011) of a β crystal of $MoO_3$ in a profile obtained by the powder X-ray diffraction (XRD) using the Cu-Kα rays as the X-ray source. An α crystal structure of molybdenum trioxide can be observed by the presence of a peak of the plane (021) (in the vicinity of 2θ: 27.32°, No. 166363 (inorganic crystal structure database, ICSD)) of the α crystal of $MoO_3$.

The molybdenum trioxide particles preferably have a ratio (β(011)/α(021)) of intensity of a peak attributed to the plane (011) of the β crystal of $MoO_3$ to intensity of a peak attributed to the plane (021) of the α crystal of $MoO_3$ (in the vicinity of 2θ:27.32°, No. 166363 (inorganic crystal structure database (ICSD)) of 0.1 or more in the profile obtained by the powder X-ray diffraction (XRD) using the Cu-Kα rays as the X-ray source.

From the peak intensity attributed to the plane (011) of the β crystal of $MoO_3$ and the peak intensity attributed to the plane (021) of the α crystal of $MoO_3$, each maximum peak intensity is read to determine the ratio (β(011)/α(021)).

In the molybdenum trioxide particles, the ratio (β(011)/α(021)) is preferably 0.1 to 10.0, more preferably 0.2 to 10.0, and particularly preferably 0.4 to 10.0.

The β crystal structure of molybdenum trioxide can also be observed by the presence of peaks at wavenumbers of 773, 848 $cm^{-1}$, and 905 $cm^{-1}$ in a Raman spectrum obtained by Raman spectroscopy. The α crystal structure of molybdenum trioxide can be observed by the presence of peaks at wavenumbers of 663 $cm^{-1}$, 816 $cm^{-1}$, and 991 $cm^{-1}$.

The average particle diameter of the primary particles of the molybdenum trioxide particles may be 5 nm or more and 2,000 nm or less.

Examples of the sulfur source include sulfur and hydrogen sulfide. These sulfur sources may be used alone or in combination of two.

The method for producing molybdenum disulfide particles may include heating the molybdenum trioxide particles made of the aggregate of the primary particles containing molybdenum trioxide having the β crystal structure at a temperature of 100° C. to 800° C. in the absence of the sulfur source, and then heating at a temperature of 200° C. to 1,000° C. in the presence of the sulfur source.

The heating time in the presence of the sulfur source may be 1 hour to 20 hours, 2 hours to 15 hours, or 3 hours to 10 hours as long as the sulfurization reaction proceeds sufficiently.

In the method for producing molybdenum disulfide particles, the feed ratio of the amount of S in the sulfur source to the amount of $MoO_3$ in the molybdenum trioxide particles is preferably set under conditions under which the sulfurization reaction proceeds sufficiently. With respect to 100 mol % of the amount of $MoO_3$ in the molybdenum trioxide particles, the amount of S in the sulfur source is preferably 450 mol % or more, more preferably 600 mol % or more, and still more preferably 700 mol % or more. With respect to 100 mol % of the amount of $MoO_3$ in the molybdenum trioxide particles, the amount of S in the sulfur source may be 3,000 mol % or less, 2,000 mol % or less, or 1,500 mol % or less.

In the method for producing molybdenum disulfide particles, the heating temperature in the presence of the sulfur source may be any temperature at which the sulfurization reaction proceeds sufficiently, and is preferably 320° C. or more, more preferably 340° C. or more, and still more preferably 360° C. or more. The heating temperature may be 320° C. to 1,000° C., 340° C. to 1,000° C., or 360° C. to 500° C. By setting the heating temperature to a low temperature, the degree of crystallinity of the molybdenum disulfide particles can decrease and the presence ratio of the amorphous phase can increase.

In the method for producing molybdenum disulfide particles, the obtained molybdenum disulfide particles may be cooled and then heated as post-treatment, if necessary. In this heating treatment, for example, the molybdenum disulfide particles are calcined in an inert atmosphere. Heating and calcining the obtained molybdenum disulfide particles allow crystallization of the amorphous phase to be promoted and the degree of crystallinity to increase. With the increase in the degree of crystallinity, each of the new 2H crystal structure and the 3R crystal structure is generated, and the presence ratio of the 2H crystal structure and 3R crystal structure varies. As described above, performing reheating as post-treatment allows the degree of crystallinity of the molybdenum disulfide particles to increase and the ease of peeling by lubrication of each layer to decrease to some extent. However, the presence ratio of the 3R crystal structure, which contributes to improvement in friction properties, increases, and thus the friction properties can be improved as compared to the case where the 2H crystal structure alone is present. The presence ratio of the 2H crystal structure to the 3R crystal structure can be adjusted by varying the temperature at which the obtained molybdenum disulfide particles are heated.

When the obtained molybdenum disulfide particles are heated and calcined at equal to or more than a predetermined temperature to change the amorphous phase to the 2H crystal structure, the second crystal phase constituted of crystallites of which crystallite size is 20 nm or less and preferably 10 nm or less is newly generated. At this time, in the 2H crystal structure, when crystallites of which crystallite size is 10 nm or less are present before the molybdenum disulfide particles are heated, the size of the crystallites grows to a crystallite size of 100 nm or more after the molybdenum disulfide particles are heated. The first crystal phase constituted of these grown crystallites is generated.

As described above, among the crystal structures of molybdenum disulfide particles, it can be considered that the crystal phase constituting the 3R crystal structure contributes to the improvement of friction properties, while the first crystal phase constituting the 2H crystal structure does not contribute to friction properties or can be a factor that deteriorates the friction properties. Therefore, from the viewpoint of retaining the presence ratio of the first crystal phase of the 2H crystal structure as low as possible while increasing the presence ratio of the crystal phase of the 3R crystal structure, the heating temperature of the molybdenum disulfide particles in the post-treatment is preferably 500° C. to 900° C. and more preferably 500° C. to 800° C.

The heating rate of the molybdenum disulfide particles is preferably 1° C./min or more and 50° C./min or less, and more preferably 2° C./min or more and 10° C./min or less.

In the method for producing molybdenum disulfide particles, the molybdenum trioxide particles preferably have a $MoO_3$ content of 99.5% or more measured by X-ray fluorescence (XRF). This allows the conversion rate $R_C$ to $MoS_2$ to increase, and molybdenum disulfide having high purity and excellent storage stability, which is not likely to generate disulfide derived from impurities, to be obtained.

The molybdenum trioxide particles preferably have a specific surface area of 10 m$^2$/g to 100 m$^2$/g measured by the BET method.

In the molybdenum trioxide particles, the specific surface area is preferably 10 m$^2$/g or more, more preferably 20 m$^2$/g or more, and still more preferably 30 m$^2$/g or more from the viewpoint of excellent reactivity with sulfur. In the molybdenum trioxide particles, the specific surface area is preferably 100 m$^2$/g or less, may be 90 m$^2$/g or less, or may be 80 m$^2$/g or less from the viewpoint of facilitation in production.

In the molybdenum trioxide particles, a ratio (I/II) of peak intensity I caused by Mo—O to peak intensity II caused by Mo—Mo is preferably more than 1.1 in the radial distribution function obtained from the extended X-ray absorption fine structure (EXAFS) profile of the K absorption edge of molybdenum.

As for the peak intensity I caused by Mo—O and the peak intensity II caused by Mo—Mo, each maximum peak intensity is read to obtain the ratio (I/II). The ratio (I/II) is considered to indicate that the β crystal structure of $MoO_3$ is obtained in the molybdenum trioxide particles, and the greater the ratio (I/II), the better the reactivity with sulfur.

In the molybdenum trioxide particles, the ratio (I/II) is preferably 1.1 to 5.0, and may be 1.2 to 4.0 or may be 1.2 to 3.0.

(Method for Producing Molybdenum Trioxide Particles)

The molybdenum trioxide particles can be produced by vaporizing a molybdenum oxide precursor compound to form molybdenum trioxide vapor and cool the molybdenum trioxide vapor.

The method for producing molybdenum trioxide particles includes calcining a raw material mixture containing the molybdenum oxide precursor compound and a metal compound other than the molybdenum oxide precursor compound to vaporize the molybdenum oxide precursor compound so as to form molybdenum trioxide vapor. The ratio of the metal compound with respect to 100% by mass of the raw material mixture is preferably 70% by mass or less in terms of oxide.

The method for producing molybdenum trioxide particles can be suitably performed by using a production apparatus 1 shown in FIG. 1.

FIG. 1 is a schematic view illustrating an example of an apparatus used for producing molybdenum trioxide particles serving as a raw material of the molybdenum disulfide particles in the present embodiment.

As shown in FIG. 1, the production apparatus 1 includes a calcining furnace 2 for calcining the molybdenum trioxide precursor compound or the raw material mixture to vaporize the molybdenum trioxide precursor compound, a cross-shaped cooling pipe 3 connected to the calcining furnace 2 for particle forming the molybdenum trioxide vapor vaporized by the calcining, and a collection device 4 as a collection unit for collecting the molybdenum trioxide particles made by forming particles in the cooling pipe 3. At this time, the calcining furnace 2 and the cooling pipe 3 are connected to each other via a discharge port 5. Further, in the cooling pipe 3, an opening degree adjustment damper 6 is disposed at an outside air intake port (not shown) at a left end portion, and an observation window 7 is disposed at an upper end portion. An air exhauster 8, which is a first air blowing unit, is connected to the collection device 4. When the air exhauster 8 exhausts air, the collection device 4 and the cooling pipe 3 suck the inside air, and the outside air is blown into the cooling pipe 3 from the opening degree adjustment damper 6 of the cooling pipe 3. That is, the air exhauster 8 passively blows air to the cooling pipe 3 by exhibiting a suction function. The production apparatus 1 may include an external cooling device 9, which allows cooling conditions for the molybdenum trioxide vapor generated from the calcining furnace 2 to be arbitrarily controlled.

Air is taken from the outside air intake port by opening the opening degree adjustment damper 6 and the molybdenum trioxide vapor vaporized in the calcining furnace 2 is cooled in an air atmosphere to obtain molybdenum trioxide particles, whereby the ratio (I/II) can be made more than 1.1, and the β crystal structure of $MoO_3$ can be easily obtained in the molybdenum trioxide particles. When the molybdenum trioxide vapor is cooled in a state where an oxygen concentration in a nitrogen atmosphere is low, for example, when the molybdenum trioxide vapor is cooled using liquid nitrogen, the oxygen defect density is likely to increase and the ratio (I/II) is likely to decrease.

The molybdenum oxide precursor compound is not particularly limited as long as the precursor compound forms molybdenum trioxide vapor by being calcined, and examples thereof include metal molybdenum, molybdenum trioxide, molybdenum dioxide, molybdenum sulfide, ammonium molybdate, phosphomolybdic acid ($H_3PMo_{12}O_{40}$), silicomolybdic acid ($H_4SiMo_{12}O_{40}$), aluminum molybdate, silicon molybdate, magnesium molybdate ($MgMo_nO_{3n+1}$ (n=1 to 3)), sodium molybdate ($Na_2Mo_nO_{3n+1}$ (n=1 to 3)), titanium molybdate, ferric molybdate, potassium molybdate ($K_2Mo_nO_{3n+1}$ (n=1 to 3)), zinc molybdate, boron molybdate, lithium molybdate ($Li_2Mo_nO_{3n+1}$ (n=1 to 3)), cobalt molybdate, nickel molybdate, manganese molybdate, chromium molybdate, cesium molybdate, barium molybdate, strontium molybdate, yttrium molybdate, zirconium molybdate, and copper molybdate. These molybdenum oxide precursor compounds may be used alone or in combination of two or more thereof. The form of the molybdenum oxide precursor compound is not particularly limited. For example, the molybdenum oxide precursor compound may be in a powder form such as molybdenum trioxide, or may be in a liquid form such as an aqueous solution of ammonium molybdate. The molybdenum oxide precursor compound is preferably in the powder form having excellent handling properties and excellent energy efficiency.

As the molybdenum trioxide precursor compound, commercially available α-crystal molybdenum trioxide is particularly preferably used. Further, when ammonium molybdate is used as the molybdenum oxide precursor compound, the ammonium molybdate is converted by calcining into molybdenum trioxide, which is thermodynamically stable, and thus the molybdenum oxide precursor compound to be vaporized turns into molybdenum trioxide.

The molybdenum trioxide vapor can also be formed by calcining a raw material mixture containing a molybdenum oxide precursor compound and a metal compound other than the molybdenum oxide precursor compound.

Of these materials, the molybdenum oxide precursor compound preferably contains molybdenum trioxide from the viewpoint of easily controlling the purity of the obtained molybdenum trioxide particles, the average particle diameter of the primary particles, and the crystal structure.

The molybdenum oxide precursor compound and the metal compound other than the molybdenum oxide precursor compound may form an intermediate, but even in this case, the intermediate is decomposed by calcining and molybdenum trioxide can be vaporized in a thermodynamically stable form.

Among these compounds used as the metal compound other than the molybdenum oxide precursor compound, an aluminum compound is preferably used to prevent damage to a calcining furnace, and the metal compound other than the molybdenum oxide precursor compound may not be used to improve the purity of the molybdenum trioxide powder.

The metal compound other than the molybdenum oxide precursor compound is not particularly limited, and examples thereof include an aluminum compound, a silicon compound, a titanium compound, a magnesium compound, a sodium compound, a potassium compound, a zirconium compound, an yttrium compound, a zinc compound, a copper compound, and an iron compound. Among these, it is preferable to use the aluminum compound, the silicon compound, the titanium compound, or the magnesium compound as the metal compound.

The molybdenum oxide precursor compound and the metal compound other than the molybdenum oxide precursor compound may form an intermediate, but even in this case, the intermediate is decomposed by calcining and molybdenum trioxide can be vaporized in a thermodynamically stable form.

As the metal compound other than the molybdenum oxide precursor compound, an aluminum compound is preferably used to prevent damage to a calcining furnace. In the production method, the metal compound other than the molybdenum oxide precursor compound may not be used to improve the purity of the molybdenum trioxide particles.

Examples of the aluminum compound include aluminum chloride, aluminum sulfate, basic aluminum acetate, aluminum hydroxide, boehmite, pseudo-boehmite, transition aluminum oxides (γ-aluminum oxide, δ-aluminum oxide, θ-aluminum oxide, and the like), α-aluminum oxide, and a mixed aluminum oxide having two or more crystal phases.

When the raw material mixture containing a molybdenum oxide precursor compound and the metal compound other than the molybdenum oxide precursor compound is calcined, the content of the molybdenum oxide precursor compound is preferably 40% by mass or more and 100% by mass or less, and may be 45% by mass or more and 100% by mass or less, or 50% by mass or more and 100% by mass or less with respect to 100% by mass of the raw material mixture.

The calcining temperature varies depending on the molybdenum oxide precursor compound and the metal compound to be used, and the desired molybdenum trioxide particles, and is usually preferably a temperature at which the intermediate can be decomposed. For example, since aluminum molybdate can be formed as the intermediate when the molybdenum compound is used as the molybdenum oxide precursor compound and the aluminum compound is used as the metal compound, the calcining temperature is preferably 500° C. to 1,500° C., more preferably 600° C. to 1,550° C., and still more preferably 700° C. to 1,600° C.

The calcining time is not particularly limited, and may be, for example, 1 minute to 30 hours, 10 minutes to 25 hours, or 100 minutes to 20 hours.

The temperature rising rate varies depending on the properties of the molybdenum oxide precursor compound and the metal compound to be used, and the desired molybdenum trioxide particles, and is preferably 0.1° C./minute to 100° C./minute, more preferably 1° C./minute to 50° C./minute, and still more preferably 2° C./minute to 10° C./minute from the viewpoint of production efficiency.

The internal pressure in the calcining furnace is not particularly limited, and may be a positive pressure or a reduced pressure, but from the viewpoint of suitably discharging the molybdenum oxide precursor compound from the calcining furnace to the cooling pipe, the calcining is preferably performed under a reduced pressure. Specifically, the degree of pressure reduction is preferably −5,000 Pa to −10 Pa, more preferably −2,000 Pa to −20 Pa, and still more preferably −1,000 Pa to −50 Pa. When the degree of pressure reduction is −5,000 Pa or more, high airtightness and mechanical strength of the calcining furnace are not excessively required, and production costs can be reduced, which is preferable. When the degree of pressure reduction is −10 Pa or less, clogging of the molybdenum oxide precursor compound at a discharge port of the calcining furnace can be prevented, which is preferable.

When a gas is blown into the calcining furnace during calcining, the temperature of the blown gas is preferably 5° C. to 500° C., and more preferably 10° C. to 100° C.

Further, the blowing speed of the gas is preferably 1 L/min or more and 500 L/min or less, and more preferably 10 L/min or more and 200 L/min or less with respect to 100 L of an effective volume of the calcining furnace.

The temperature of the vaporized molybdenum trioxide vapor varies depending on the type of the molybdenum oxide precursor compound to be used, and is preferably 200° C. to 2,000° C., and more preferably 400° C. to 1,500° C. When the temperature of the vaporized molybdenum trioxide vapor is 2,000° C. or less, usually, the vapor tends to easily form particles by blowing outside air (0° C. to 100° C.) into the cooling pipe.

The discharge rate of the molybdenum trioxide vapor discharged from the calcining furnace can be controlled based on the amount of the molybdenum oxide precursor compound to be used, the amount of the metal compound to be used, the temperature of the calcining furnace, blowing of the gas into the calcining furnace, and the diameter of the discharge port of the calcining furnace. The discharge rate also varies depending on the cooling capacity of the cooling pipe, and the discharge rate of the molybdenum trioxide vapor discharged from the calcining furnace to the cooling pipe is preferably 0.001 g/min or more and 100 g/min or less, and more preferably 0.1 g/min or more and 50 g/min or less.

Further, the content of the molybdenum trioxide vapor contained in the gas discharged from the calcining furnace is preferably 0.01 mg/L or more and 1,000 mg/L or less, and more preferably 1 mg/L or more and 500 mg/L or less.

Next, the molybdenum trioxide vapor is cooled to form particles.

The molybdenum trioxide vapor is cooled by lowering the temperature of the cooling pipe. In this case, examples of a cooling method include cooling by blowing a gas into the cooling pipe as described above, cooling by a cooling mechanism included in the cooling pipe, and cooling by an external cooling device.

The molybdenum trioxide vapor is preferably cooled in an air atmosphere. When the molybdenum trioxide vapor is cooled in an air atmosphere to form molybdenum trioxide particles, the ratio (I/II) can be made more than 1.1, and the β crystal structure of $MoO_3$ can be easily obtained in the molybdenum trioxide particles.

The cooling temperature (temperature of the cooling pipe) is not particularly limited, and is preferably −100° C. to 600° C., and more preferably −50° C. to 400° C.

The cooling rate of the molybdenum trioxide vapor is not particularly limited, and is preferably 100° C./s or more and 100,000° C./s or less, and more preferably 1,000° C./s or more and 50,000° C./s or less. As the cooling rate of the molybdenum trioxide vapor increases, molybdenum trioxide particles having a smaller particle diameter and a larger specific surface area tend to be obtained.

When the cooling is performed by blowing a gas into the cooling pipe, the temperature of the blown gas is preferably −100° C. to 300° C., and more preferably −50° C. to 100° C.

Further, the blowing speed of the gas is preferably 0.1 m³/min or more and 20 m³/min or less, and more preferably 1 m³/min or more and 10 m³/min or less. When the blowing speed of the gas is 0.1 m³/min or more, a high cooling rate can be achieved, and clogging in the cooling pipe can be prevented, which is preferable. In contrast, when the blowing speed of the gas is 20 m³/min or less, the first air blowing unit (such as an air exhauster), which is expensive is no longer needed, and production costs can be reduced, which is preferable.

The particles obtained by cooling the molybdenum trioxide vapor are transported to the collection device for collection.

In the method for producing molybdenum trioxide particles, the particles obtained by cooling the molybdenum trioxide vapor may be calcined again at a temperature of 100° C. to 320° C.

That is, the molybdenum trioxide particles obtained by the method for producing molybdenum trioxide particles may be calcined again at a temperature of 100° C. to 320° C. The calcining temperature in the re-calcining may be 120° C. to 280° C. or 140° C. to 240° C. A calcining time in the re-calcining may be, for example, 1 minute to 4 hours, 10 minutes to 5 hours, or 100 minutes to 6 hours. However, a part of the R crystal structure of molybdenum trioxide disappears due to re-calcining, and when calcining is performed at a temperature of 350° C. or more for 4 hours, the β crystal structure of the molybdenum trioxide particles disappears, the ratio (β(011)/α(021)) is 0, and the reactivity with sulfur is impaired.

As described above, the molybdenum trioxide particles suitable for producing the molybdenum disulfide particles can be produced by the method for producing the molybdenum trioxide particles.

<Lubricating Composition>

The lubricating composition according to the present embodiment contains the molybdenum disulfide particles and a base oil constituted of one or more of mineral oil, synthetic oil, and partially synthetic oil.

Examples of the base oil as mineral oil include oil obtained by rock drilling, oil obtained from plants or animals, and a mixture thereof. Examples of such oil include, but not limited to, castor oil, lard oil, olive oil, peanut oil, corn oil, soybean oil, linseed oil, liquid petroleum, and paraffinic oil, naphthenic oil, or mixed paraffin-naphthenic base oil. Such base oil may be partially or fully hydrogenated, if necessary.

The base oil being the synthetic oil include polyalphaolefin-based, hydrocarbon-based, ester-based, ether-based, silicone-based, alkylnaphthalene-based, or perfluoroalkyl polyether-based base oil.

The base oil being the partially synthetic oil refers to base oil that is a mixture of the mineral oil and the synthetic oil.

In the lubricating composition, base oil generally used for lubricating compositions may be used as the base oil without limitation.

The kinematic viscosity of the base oil used in the lubricating composition according to the present embodiment at 40° C. may be 1 mm²/s or more and 1000 mm²/s or less, 5 mm²/s or more and 200 mm²/s or less, or 10 mm²/s or more and 150 mm²/s or less. In the lubricating composition according to the present embodiment, the median diameter $D_{50}$ of the molybdenum disulfide particles determined by dynamic light scattering is as small as 10 nm or more and 1,000 nm or less, and thus sedimentation of the molybdenum disulfide particles can be reduced even when a base oil having a relatively low viscosity is used.

The lubricating composition preferably contains 0.0001% by mass or more and 10% by mass or less, more preferably 0.01% by mass or more and 10% by mass or less, and still more preferably 0.01% by mass or more and 1% by mass or less of the molybdenum disulfide particles serving as the lubricant with respect to 100% by mass of the total mass of the lubricating composition.

The lubricating composition according to the present embodiment may further contain organometallic complex particles in the lubricating composition. This lubricating composition contains preferably 0.0001% by mass or more and 10% by mass or less, more preferably 0.01% by mass or more and 10% by mass or less, and still more preferably 0.01% by mass or more and 1% by mass or less of the organometallic complex particles with respect to 100% by mass of the total mass of the lubricating composition containing the above lubricating composition and the organometallic complex particles. Containing 0.0001% by mass or more and 10% by mass or less of the organometallic complex particles allows the friction coefficient to be significantly reduced and the low friction coefficient to be maintained over a long period of time.

Examples of typical organometallic complexes constituting the organometallic complex particles include organomolybdenum complexes such as molybdenum dialkyl dithiocarbamate (MoDTC) and molybdenum dialkyl dithiophosphate (MoDTP). Organozinc complexes such as zinc dialkyl dithiophosphate (ZnDTP) may also be included. Several types of these known organometallic complex particles may also be contained in combination.

The lubricating composition and the lubricating composition may further contain known additives such as cleaning agents, viscosity modifiers, anti-foaming agents, corrosion inhibitors, rust inhibitors, antioxidants, anti-wear agents, and friction adjusters.

The lubricating composition may further contain known dispersing agents contained in common lubricating oil. The presence of the dispersing agent ensures storage stability by further reducing sedimentation.

EXAMPLES

Hereinafter, Examples of the present invention will be described. However, the present invention is not limited to Examples described later.

Synthesis Example (Production of Molybdenum Trioxide Particles)

A calcining furnace equivalent to a heat resistant container, a cooling pipe provided with an outside air supply port, and a dust collector to collect a molybdenum oxide were prepared. A metal oxide was produced using an RHK simulator (manufactured by NORITAKE CO., LIMITED) as the calcining furnace and a VF-5N dust collector (manufactured by AMANO Corporation) as the dust collector.

1.5 kg of aluminum hydroxide (manufactured by Nippon Light Metal Company, Ltd.) and 1 kg of molybdenum trioxide (manufactured by NIPPON MUKI CO., LTD.) were mixed, and then the resultant mixture was charged in a sagger. The calcining furnace, the cooling pipe, and the dust collector were connected, and the resultant mixture was calcined at 1,100° C. for 10 hours. During the calcining, outside air (blowing speed: 150 L/min, outside air temperature: 25° C.) was introduced from a side face and a lower face of the calcining furnace. Molybdenum trioxide was evaporated in the furnace and then cooled in the vicinity of the dust collector to precipitate as particles, and thus molybdenum trioxide was collected with the dust collector.

After calcining, 1.0 kg of aluminum oxide being a blue powder and 0.8 kg of the molybdenum trioxide collected by the dust collector were taken out from the sagger.

It was found that the collected molybdenum trioxide had an average particle diameter of primary particles of 1 μm or less and the purity of molybdenum trioxide measured by X-ray fluorescence (XRF) was 99.8%.

(Production of Molybdenum Disulfide Particles)

Example 1

Into an alumina crucible, 40.0 g (277.9 mmol) of molybdenum trioxide prepared in Synthesis Example 1 and 40.0 g (1,250 mmol, 4.5 equivalents to Mo atoms) of sulfur powder (manufactured by KANTO CHEMICAL CO., INC.) were placed and mixed with a stirring rod so as to prepare a uniform powder.

After mixing, the alumina crucible was covered with a lid and placed in a high-temperature atmosphere calcining furnace (SKM-2030P-OP, manufactured by MOTOYAMA CO., LTD.). Calcining was performed after vacuuming inside of the furnace and then purging with nitrogen. As calcining conditions, temperature was raised from a room temperature condition of 25° C. at a rate of 5° C./min and after reaching to 500° C., the temperature was retained for 4 hours. During the calcining process, nitrogen gas was blown at 0.5 L/min. The temperature was then decreased by allowing the furnace to cool down naturally to give 44.5 g of molybdenum disulfide particles.

The samples of these molybdenum disulfide particles were measured with a specific surface area meter (BEL-SORP-mini manufactured by MicrotracBEL Corp.). The surface area per gram of the sample measured from the amount of the adsorbed nitrogen gas by a BET method was calculated as the specific surface area. The specific surface area was found to be 44.5 $m^2$/g.

Example 2

Molybdenum disulfide particles were prepared in the same manner as in Example 1, and then 3.39 g of the molybdenum disulfide particles were placed in an alumina crucible (BA-0, manufactured by Tokyo Garasu Kikai Co., Ltd.), the alumina crucible was covered with a lid, and molybdenum disulfide particles were calcined in a tube furnace (TSS-1130-P, manufactured by YAMADA DENKI CO., LTD.) for 4 hours at a calcining temperature of 950° C. with a temperature rising rate of 5° C./min under a nitrogen atmosphere. The resultant product was allowed to cool naturally to give 3.27 g of molybdenum disulfide particles.

Example 3

3.13 g of molybdenum disulfide particles were obtained in the same manner as in Example 2 except that the calcining temperature of the molybdenum disulfide particles was changed to 1,100° C. with a preparation volume of 3.41 g.

Comparative Example 1

Commercially available molybdenum disulfide ($MoS_2$) particles (molybdenum disulfide reagent, manufactured by Kanto Chemical Co., Ltd.) were prepared.

The molybdenum disulfide particles obtained in Examples 1 to 3 and Comparative Example 1 were measured and evaluated by the following methods.

[Identification and Analysis of Crystal Structures]

The sample of the molybdenum disulfide particles was filled into a sample holder for measurement made of SUS with the measurement surface being smooth so that the thickness was 2.4 mm and the inner diameter was 27 mm, and the filled holder was set in a multipurpose X-ray diffraction (XRD) system (Empyrean3, manufactured by Malvern Panalytical Ltd.). Measurement was performed using a monochromator on the incident side and a semiconductor high-speed detector (1D mode) on the detector side under 45 kV/40 mA with CuKα rays, and using a rotating stage under conditions of a measurement time of 8 minutes (Examples 1 and 2, and Comparative Example 1) or 10 minutes (Example 3), a step size of 0.066 degrees (Examples 1 and 2, and Comparative Example 1) or 0.026 degrees (Example 3), and a scanning range of 5 degrees or more and 100 degrees or less by a concentration method to give XRD profiles.

Rietveld analysis including crystallite size evaluation was performed using software (High Score Plus, manufactured by Malvern Panalytical Ltd.).

Calculation of the degree of crystallinity of the molybdenum disulfide particles was performed by (1) determining a boundary line between the background A derived from the device and the obtained diffraction profile in the range of 10° to 95°, and subtracting the background A from the obtained diffraction profile, (2) determining a broad peak B called amorphous halo derived from an amorphous phase in the range of 10° to 95°, and further subtracting the background B from the obtained diffraction profile, and (3) dividing the sum of the peak intensities derived from the crystals above the background A and the amorphous halo B by the sum of the intensities in the XRD profile excluding the background A. The maximum value of the degree of crystallinity is 99.95%, representing a state where all of the molybdenum disulfide particles are crystallized.

The presence ratio of the first crystal phase of the 2H crystal structure, the 3R crystal structure, and the second crystal phase of the 2H crystal structure in the molybdenum disulfide particles were determined, specifically in Example 1, by determining the crystallite size and the presence ratio of the 2H crystal structure by the broad peaks in the vicinity of 40° and in the vicinity of 50°, and determining the difference by performing operation of reproducing the overall actually measured XRD profile by optimizing the 3R crystal structure parameters with two peaks in the vicinity of 33° and two peaks in the vicinity of 40°.

In Examples 2 and 3, in which the XRD profile was not capable of being sufficiently fitted even using the above method, the presence ratio was determined by setting a crystal structure having a crystallite size smaller than that of the 2H crystal structure (the crystal phase) in the crystal phase and reproducing the entire measured XRD profile.

[Basic Formula and Calculation for Crystallite Size Evaluation]

In general, the diffraction profiles were used to determine the crystallite sizes of the 2H crystal structure (first crystal phase and second crystal phase) and 3R the crystal structure using an analysis formula $L=K\lambda/\beta \cos\theta$ as a basic formula. In the above formula, K is an instrumental constant that depends on the XRD optical system (incident side and detector side) and settings, L is the crystallite size [m], $\lambda$ is a measured X-ray wavelength [m], $\beta$ is a half width [rad], and $\theta$ is the Bragg angle of the diffraction line [rad].

[Measurement of Median Diameter $D_{50}$ of Molybdenum Disulfide Particles]

0.1 g of the molybdenum sulfide powder was added to 20 cc of acetone and the resultant mixture was subjected to ultrasonic treatment in an ice bath for 4 hours. Then, the concentration thereof was appropriately adjusted with acetone to a concentration within a measurable range of a dynamic light scattering-type particle diameter distribution analyzer (Nanotrac Wave II manufactured by MicrotracBEL Corp.) to give a measurement sample. Using this measurement sample, the particle diameter distribution in the range of a particle diameter of 0.0001 µm to 10 µm was measured with the dynamic light scattering-type particle diameter distribution analyzer to calculate the median diameter $D_{50}$ (z average). However, for those having a median diameter $D_{50}$ of more than 10 µm (Comparative Example 1), similarly, a solution was adjusted and the particle diameter distribution in the range of particle diameters of 0.015 µm to 500 µm was measured with a laser diffraction-type particle size distribution analyzer (SALD-7000 manufactured by Shimadzu Corporation) to calculate the median diameter $D_{50}$.

[Measurement of (I/II) of Molybdenum Disulfide Particles]

36.45 mg of the molybdenum disulfide particles and 333.0 mg of boron nitride were mixed using a mortar. 123.15 mg of this mixture was weighed and compression molded into a tablet having a diameter of 8 mm to give a measurement sample. Using this measurement sample, the extended X-ray absorption fine structure (EXAFS) was measured by a transmission method with BL5S1 of Aichi Synchrotron Radiation Center. Athena (Internet <URL: https://brucerav-el.github.io/demeter/>) was used for analysis.

In a radial distribution function obtained from the profile, the ratio (I/II) of the peak intensity I caused by Mo—S to the peak intensity II caused by Mo—Mo was 1.26 (=19/15).

[Friction Coefficient Measurement and Friction Evaluation of Lubricating Compositions Containing Molybdenum Disulfide Particles]

To 90 parts by mass of lubricating oil (Super Oil N32, manufactured by JXTG Nippon Oil & Energy Corporation), 10 parts by mass of an additive (Aclube 702, manufactured by Sanyo Chemical Industries, Ltd.) and 0.08 part by mass of the molybdenum disulfide particles were added, and the resultant mixture was subjected to ultrasonic dispersion for 1 hour to prepare a lubricating composition.

The friction and wear test was performed using a rheometer testing machine (MCR-502, manufactured by Anton Paar GmbH) equipped with a temperature controllable stage dedicated for sliding property evaluation (Tribocell). Into a stage where the flat parts of three SUJ2 special stainless steel cylindrical pins were inclined 45 degrees in the height direction and the pins were evenly aligned at 120 degrees with each other in the horizontal direction when viewed from directly above, the lubricating composition prepared by the above method was poured to immerse the contact surface. From the above of the contact surface, one ½-inch SUJ2 special stainless steel ball was contacted and a predetermined load was applied in a vertical direction. After leaving to stand for 5 minutes, the rotation speed of this SUJ2 ball varied from $3.0 \times 10^{-5}$ rpm to 3,120 rpm to acquire the friction coefficient at each rotation speed. The case where the friction coefficient was less than the friction coefficient of Comparative Example was determined to be excellent "o", the best case was determined to be "⊚", and the case where the friction coefficient was equal to or higher than the friction coefficient of Comparative Example was determined to be poor "x".

The results of the measurements and evaluations described above are shown in Tables 1 and 2 and shown in FIGS. 2 to 11B.

TABLE 1

| | Heating conditions | | MoS₂ Particles | | | |
| | Calcining temperature [° C.] | Post-calcining temperature [° C.] | Degree of crystallinity [%] | Presence ratio of amorphous phase [%] | $D_{50}$ [nm] | Specific surface area BET Method [m³/g] |
| --- | --- | --- | --- | --- | --- | --- |
| Example 1 | 500 | — | 78.7 | 21.3 | 251 | 44.5 |
| Example 2 | 500 | 950 | 89.1 | 10.9 | 245 | 35.0 |

TABLE 1-continued

| | Heating conditions | | MoS$_2$ Particles | | | |
| | | | | Presence | | Specific |
| | Calcining temperature [° C.] | Post-calcining temperature [° C.] | Degree of crystallinity [%] | ratio of amorphous phase [%] | $D_{50}$ [nm] | surface area BET Method [m$^3$/g] |
|---|---|---|---|---|---|---|
| Example 3 | 500 | 1,100 | 94.4 | 5.6 | 319 | 12.3 |
| Comparative Example 1 | — | — | 99.95 | 0.05 | 13,340 | 5.6 |

TABLE 2

| | 2H Crystal structure (more than 20 nm) | | 3R Crystal structure (crystal phase) | | 2H Crystal structure (20 nm or less) | | Friction coefficient | | |
|---|---|---|---|---|---|---|---|---|---|
| | Presence ratio in crystal phase [%] | Crystallite size [nm] | Presence ratio in crystal phase [%] | Crystallite size [nm] | Presence ratio in crystal phase [%] | Crystallite size [nm] | 0.33 rpm [—] | 50 rpm [—] | Friction evaluation |
| Example 1 | 0 | — | 28.5 | 11.8 | 71.5 | 9.6 | 0.189 | 0.115 | ⊚ |
| Example 2 | 23.5 | 134.9 | 49.3 | 12.5 | 27.2 | 3.0 | 0.254 | 0.120 | ○ |
| Example 3 | 21.3 | 118.3 | 57.7 | 36.3 | 21.0 | 4.3 | 0.242 | 0.125 | ○ |
| Comp Example 1 | 97.1 | 64.9 | 2.9 | 88.3 | 0 | — | 0.283 | 0.143 | X |

Figure 2:
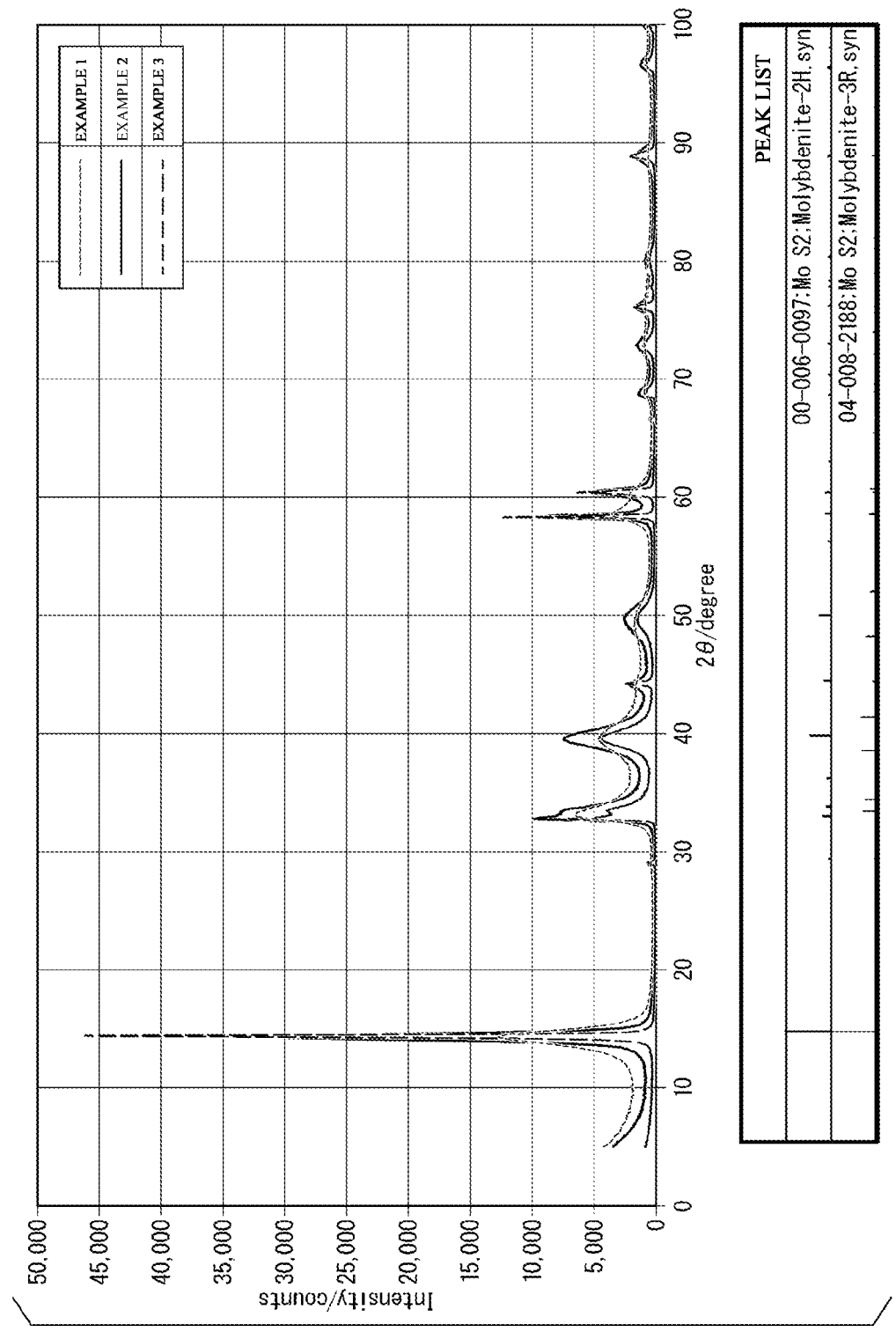
FIG. 2 is a graph illustrating X ray diffraction (XRD) profiles of the molybdenum disulfide particles obtained in Examples 1 to 3 in a superimposed manner.

First, a part of the X-ray diffraction (XRD) profiles of the molybdenum disulfide particles obtained in Examples 1 to 3 are shown in FIG. 2. As shown in FIG. 2, the main peak (A in FIG. 2) in Examples 1 to 3 coincided in the vicinity of 2θ:14° and the main peaks of the 3R crystal structure and the 2H crystal structure as the references also coincided. In Examples 1 to 3, the peaks (B in FIG. 2) in the vicinity of 2θ:39.5° and in the vicinity of 2θ:49.5° coincided with each other and approximately coincided with the positions of the peaks of the 3R crystal structure and the 2H crystal structure as references. However, the peak shapes were different and thus it was found that the presence ratio and the crystallite sizes of the 3R crystal structure and the 2H crystal structure were different depending on the heating conditions.

In FIG. 2, the diffraction profiles of Examples 1 to 3 are different from each other and thus it was found that the crystal state of the molybdenum disulfide particles changed with or without post-calcining and at different post-calcining temperatures.

Figure 3:
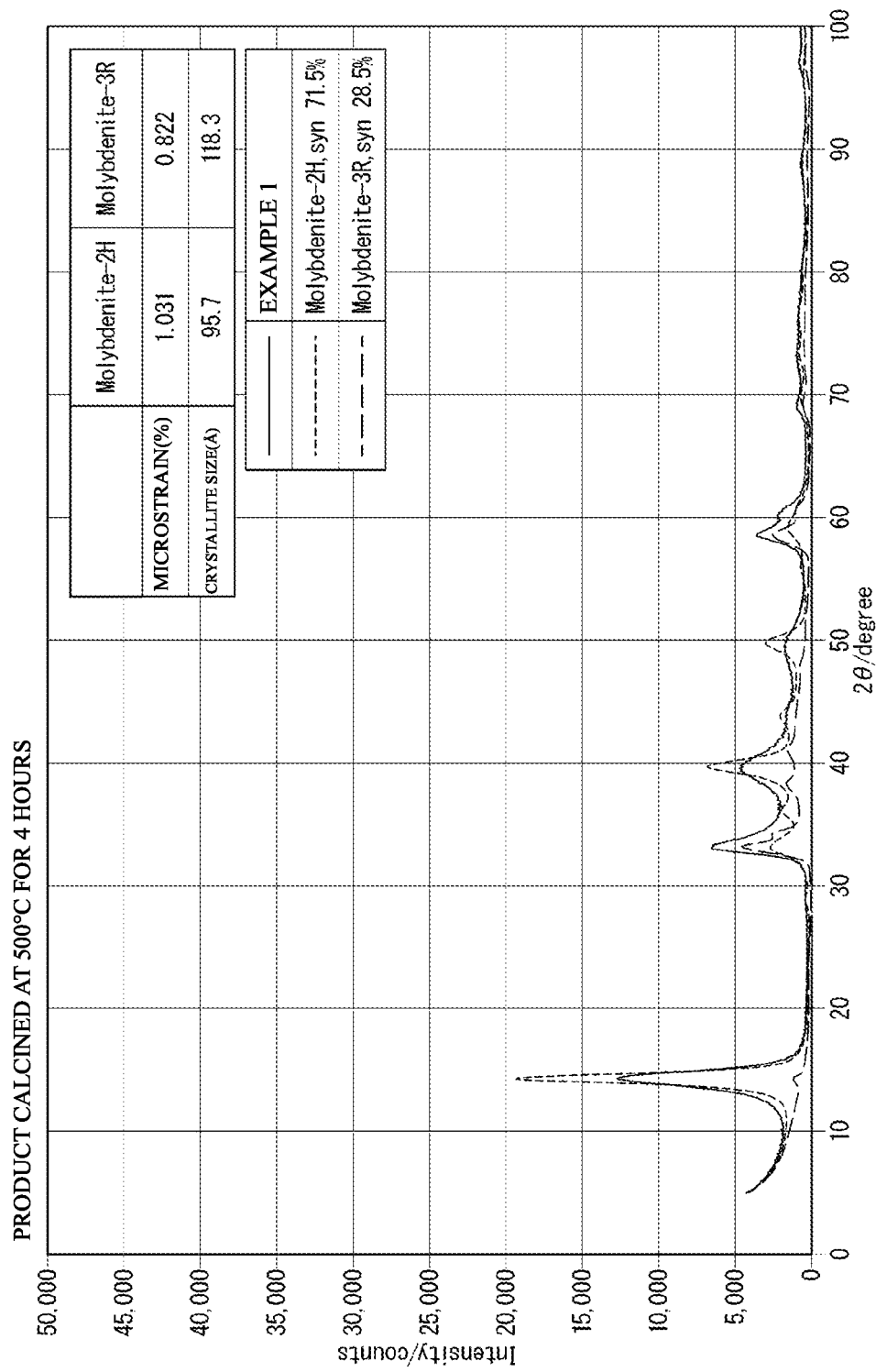
FIG. 3 is a graph illustrating an X ray diffraction (XRD) profile of the molybdenum disulfide particles obtained in Example 1.
Figure 4:
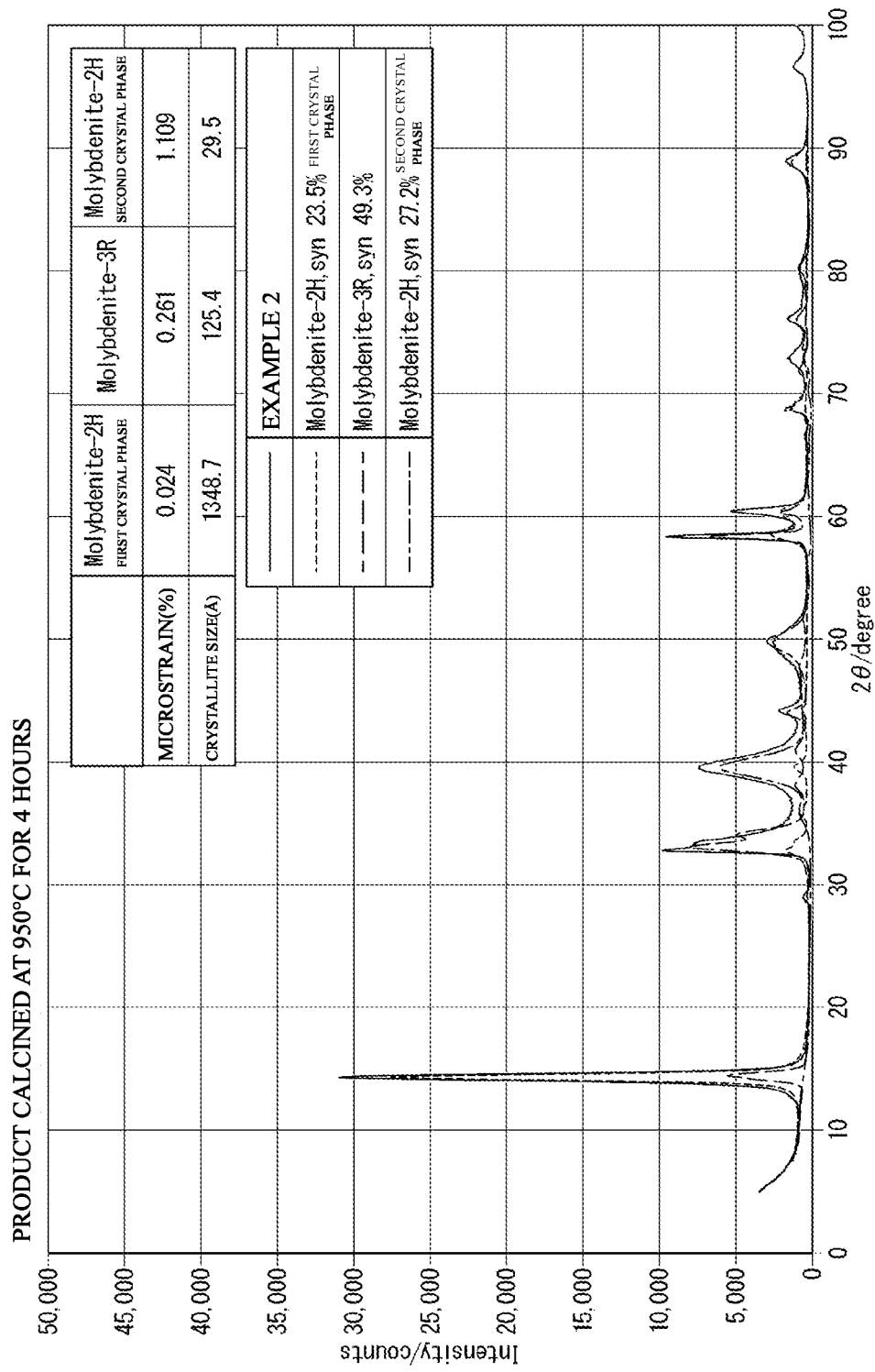
FIG. 4 is a graph illustrating an X ray diffraction (XRD) profile of the molybdenum disulfide particles obtained in Example 2.
Figure 5:
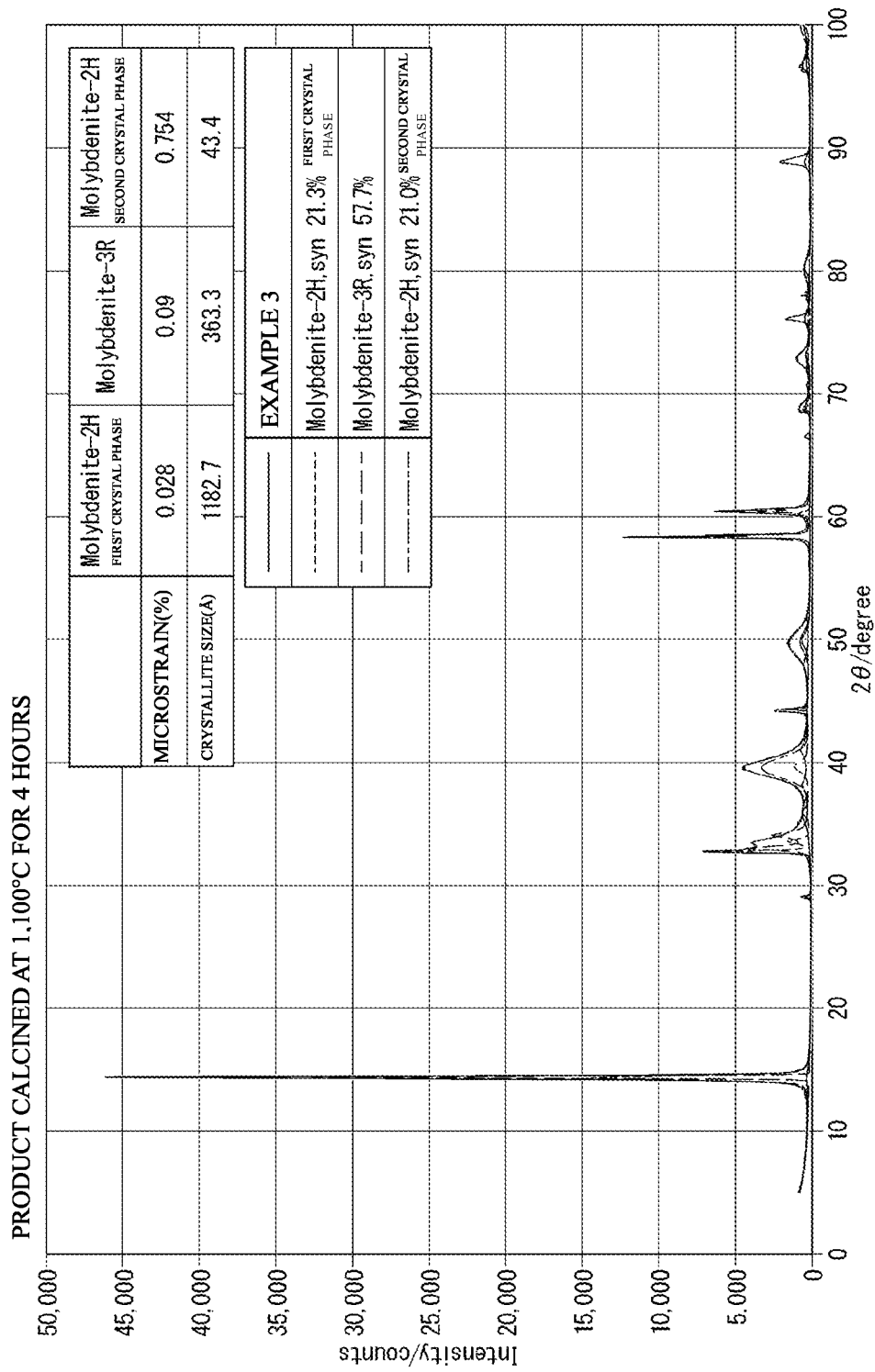
FIG. 5 is a graph illustrating an X ray diffraction (XRD) profile of the molybdenum disulfide particles obtained in Example 3.

Next, it was found from the results in FIG. 3 that when the waveform separation of each of the diffraction profiles of Examples 1 to 3 was performed, the 3R crystal structure and two types of the 2H crystal structures were present in Example 1 (calcining temperature 500° C., no post-calcining). The diffraction profiles of Example 2 (calcining temperature of 500° C., post-calcining temperature of 950° C.) and Example 3 (calcining temperature of 500° C., post-calcining temperature of 1,100° C.) were different from the diffraction profile of Example 1 in FIG. 2, and thus the presence of a second crystal phase of the 2H crystal structure having a smaller crystallite size was assumed in addition to the 3R crystal structure and the 2H crystal structure to perform extended-type Rietveld analysis. As a result, it was found that in both Examples 2 and 3, in addition to the 3R crystal structure and the first crystal phase of the 2H crystal structure as crystal phases, the second crystal phase of the 2H crystal structure having extremely small crystallite size was present (FIG. 4 and FIG. 5).

Figure 6:
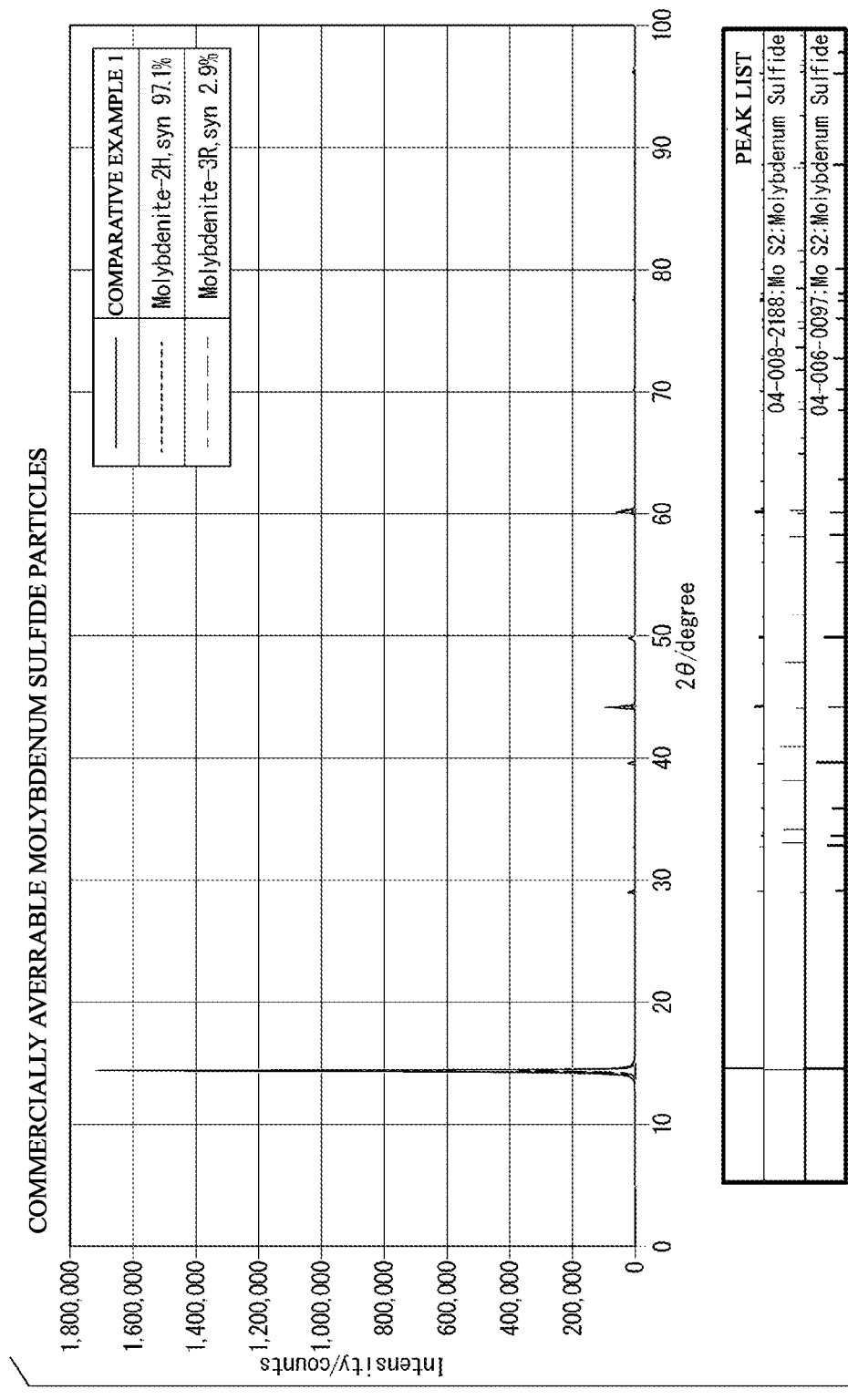
FIG. 6 is a graph illustrating an X ray diffraction (XRD) profile of the molybdenum disulfide particles obtained in Comparative Example 1.

On the other hand, in Comparative Example 1, as shown in FIG. 6, although the presence of a small amount of the 3R crystal structure was found in the commercially available molybdenum disulfide particles, almost all of these molybdenum disulfide particles were found to be constituted of the 2H crystal structure (see Table 2). The degree of crystallinity was 99.95%, and thus it was found that all commercially available molybdenum disulfide particles are constituted of the crystal phases. The median diameter $D_{50}$ of the commercially available molybdenum disulfide particles was 13,340 nm.

Figure 7:
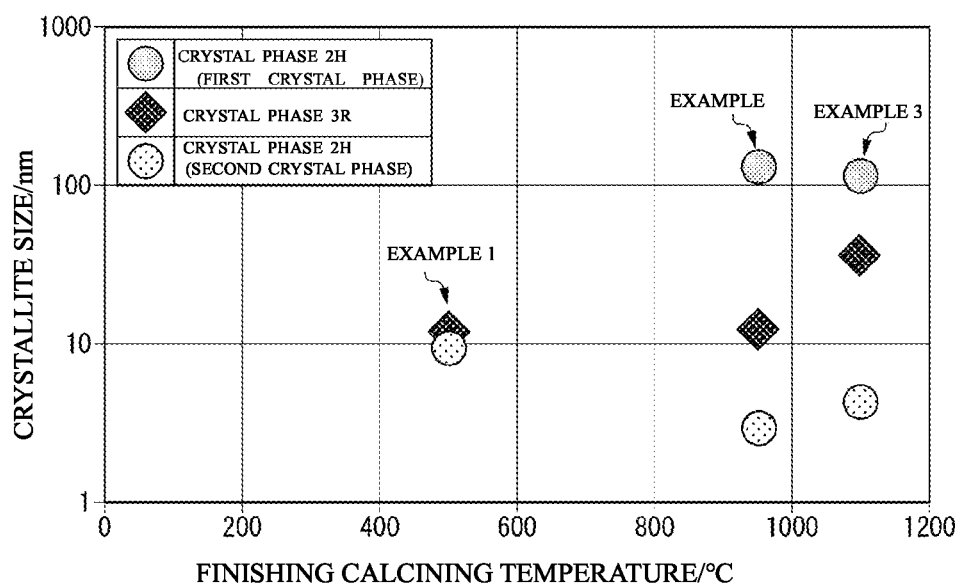
FIG. 7 is a graph illustrating a relationship between a calcining temperature and a crystallite size in Examples 1 to 3.

Next, the relationship between finishing calcining temperature and a crystallite size in Examples 1 to 3 is shown in FIG. 7. As shown in FIG. 7, in Example 1, the crystallite size of the 2H crystal structure (crystal phase) was 9.6 nm and the crystallite size of the 3R crystal structure (crystal phase) was 11.8 nm. Therefore, it was found that the crystallite size of the 2H crystal structure (crystal phase) was 10 nm or smaller. In Example 2, the crystallite size of the 2H crystal structure (first crystal phase) was 134.9 nm, the crystallite size of the 3R crystal structure (crystal phase) was 12.5 nm, and the crystallite size of the 2H crystal structure (second crystal phase) was 3.0 nm. In Example 3, the crystallite size of the 2H crystal structure (first crystal phase) was 118.3 nm, the crystallite size of the 3R crystal structure (crystal phase) was 36.3 nm, and the crystallite size of the 2H crystal structure (second crystal phase) was 4.3 nm. From this result, it was found that the crystallites of the 2H crystal structure (crystal phase) grew larger by the post-calcining to become crystallites of the 2H crystal structure (first crystal phase), and the crystallite size of the newly generated 2H crystal structure (second crystal phase) by the post-calcining was smaller than that of the 2H crystal structure (crystal phase) before the post-calcining.

Figure 8:
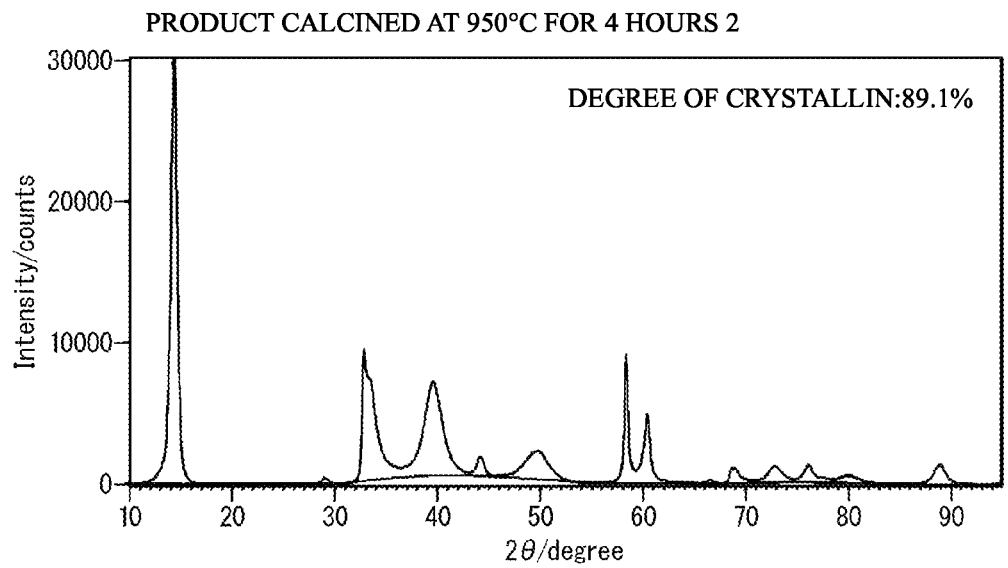
FIG. 8 is a graph illustrating an X-ray diffraction (XRD) profile used to calculate a degree of crystallinity of the molybdenum disulfide particles obtained in Example 2.
Figure 9:
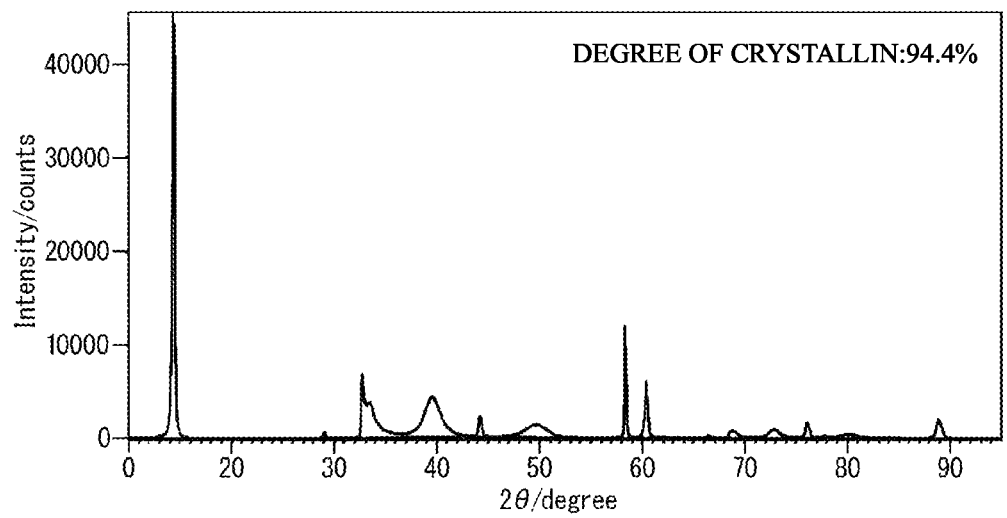
FIG. 9 is a graph illustrating an X-ray diffraction (XRD) profile used to calculate a degree of crystallinity of the molybdenum disulfide particles obtained in Example 3.
Figure 10:
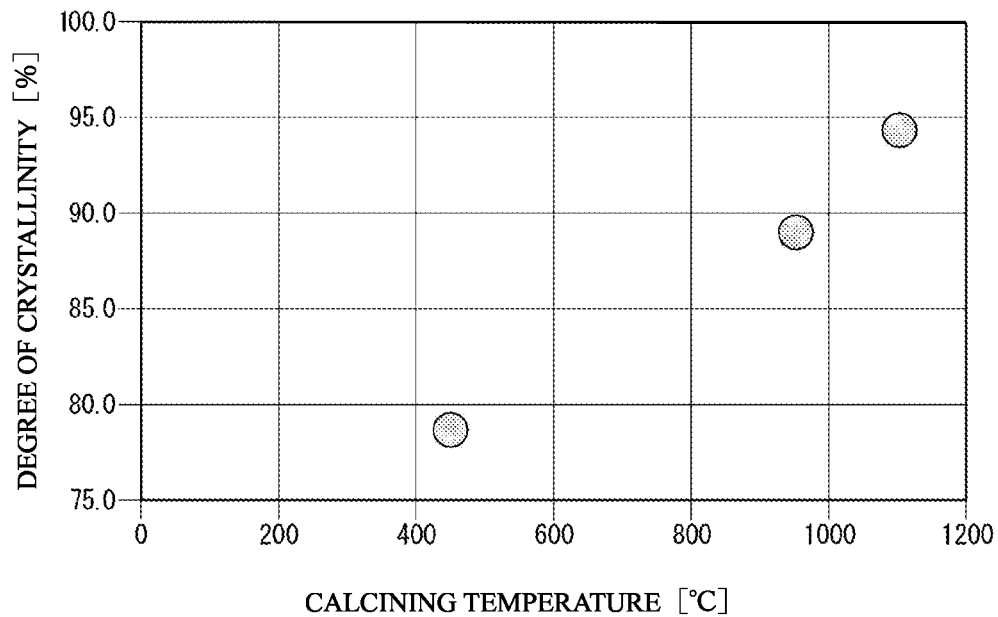
FIG. 10 is a graph illustrating a relationship between the calcining temperature and a degree of crystallinity in Examples 1 to 3.

Next, the X-ray diffraction (XRD) profiles used to calculate the degree of crystallinity of the molybdenum disulfide particles obtained in Example 2 and Example 3 are shown in FIG. 8 and FIG. 9, respectively. The relationship between the calcining temperature and the degree of crystallinity in Examples 1 to 3 is shown in FIG. 10.

As the result of calculating the degree of crystallinity from the obtained diffraction profiles, the degree of crystallinity was 78.7% in Example 1 (calcining temperature of 500° C., no post-calcining), 89.1% in Example 2 (calcining temperature of 500° C., post-calcining temperature of 950° C.), and 94.4% in Example 3 (calcining temperature of 500° C., post-calcining temperature of 1,100° C.). From this result, it was found that the degree of crystallinity of the molybdenum disulfide particles increased when the post-calcining was performed, and as the post-calcining temperature was set to be higher while the calcining temperature was kept the same, the degree of crystallinity of the molybdenum disulfide particles became further higher.

Figure 11A:
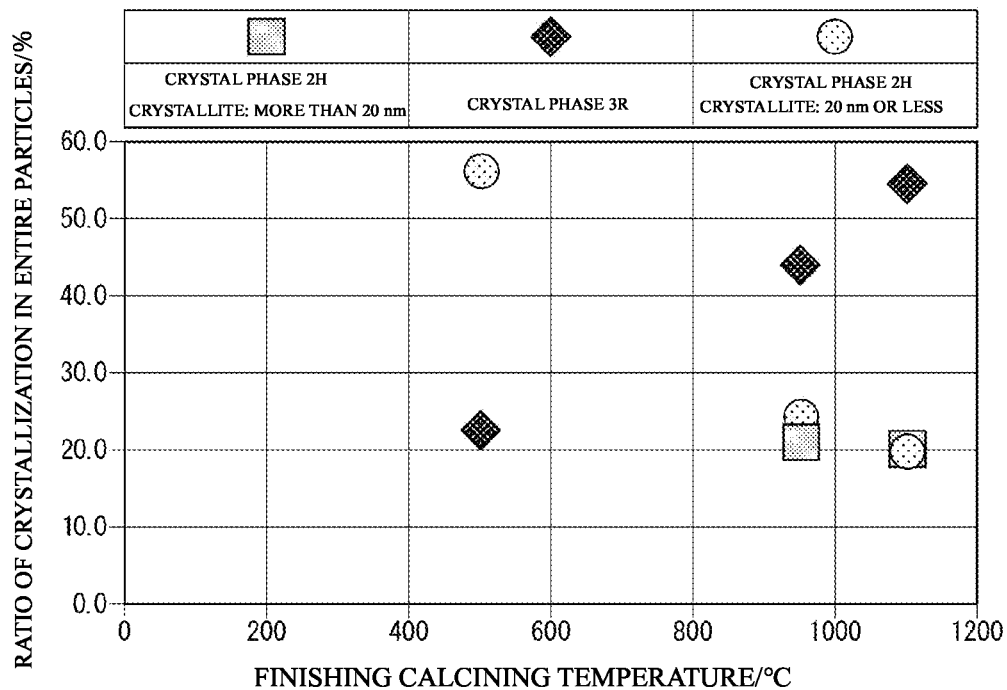
FIG. 11A is a graph illustrating a relationship between the calcining temperature and the presence ratio of a 2H crystal structure and a 3R crystal structure in a crystal phase in Examples 1 to 3.

Next, the relationship between the calcining temperature and the presence ratio of the 2H crystal structure and the 3R crystal structure in the crystal phase in Examples 1 to 3 is shown in FIG. 11A. As a result of calculating the presence ratio of each crystal structure, in Example 1, the presence ratio of the 2H crystal structure (crystallite size: 20 nm or less) in the crystal phase was 71.5% and the presence ratio of the 3R crystal structure was 28.5%. In Example 2, the presence ratio of the first crystal phase of the 2H crystal structure (crystallite size: more than 20 nm) in the crystal phase was 23.5%, the presence ratio of the 3R crystal structure was 49.3%, and the presence ratio of the second crystal phase of the 2H crystal structure (crystallite size: 20 nm or less) was 27.2%. In Example 3, the presence ratio of the first crystal phase of the 2H crystal structure (crystallite size: more than 20 nm) in the crystal phase was 21.3%, the presence ratio of the 3R crystal structure was 57.7%, and the presence ratio of the second crystal phase of the 2H crystal structure (crystallite size: 20 nm or less) was 21.0%. From this result, it was found that when the molybdenum trioxide particles were calcined at a calcining temperature of 500° C., the presence ratio of the 3R crystal structure in the crystal phase was capable of increasing to about 30%. Furthermore, it was found that when the post-calcining was performed at 950° C., the presence ratio of the amorphous phase of the molybdenum disulfide particles became as low as 10.9%, while the presence ratio of the 3R crystal structure in the crystal phase became higher, and when the calcining temperature was the same and the post-calcining temperature was raised to 1,100° C., the presence ratio of the amorphous phase of molybdenum disulfide particles became as low as 5.6%, while the ratio of the 3R crystal structure in the crystal phase became further higher.

Figure 11B:
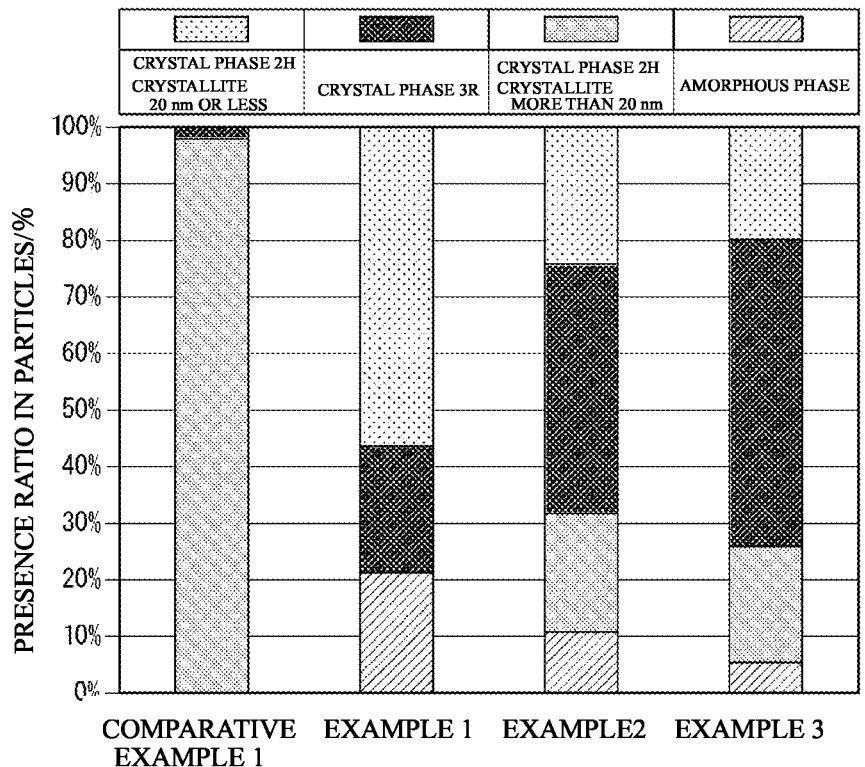
FIG. 11B is a graph illustrating a relationship between the calcining temperature and the presence ratio of a first crystal phase and a second crystal phase of the 2H crystal structure, a 3R crystal structure, and an amorphous phase in particles in Examples 1 to 3 and Comparative Example 1.

FIG. 11B is a graph illustrating the relationship between the calcining temperature and the presence ratio of the first crystal phase and the second crystal phase of the 2H crystal structure, the 3R crystal structure, and the amorphous phase in the particles in Examples 1 to 3 and Comparative Example 1. As shown in FIG. 11B, the presence ratio of the 3R crystal structure in the particles in Example 1 significantly increased compared to that in Comparative Example 1. It was also found that the presence ratio of the 2H crystal structure formed of the crystal phase having a crystallite size of 20 nm or less was higher than those in Examples 2 and 3, and furthermore, the presence ratio of the amorphous phase of the molybdenum disulfide particles was also higher than those in Examples 2 and 3.

It was found that in Examples 2 and 3, the presence ratio of the amorphous phase was lower than that in Example 1 and higher than that in Comparative Example 1 due to the promotion of the crystallization of the amorphous phase, and the presence ratio of the 3R crystal structure was correspondingly higher than that in Comparative Example 1.

It was also found that in Examples 2 and 3, when the amorphous phase changed to the 2H crystal structure by the post-calcining, the second crystal phase having a crystallite size of 20 nm or less was generated, and crystallites of the 2H crystal structure having a crystallite size of 20 nm or less at the time of calcining at 500° C. grew to crystallites of 100 nm or more by the post-calcining (see Table 2).

The results of the friction coefficients calculated in Examples 1 to 3 and Comparative Example 1 and the friction evaluation are shown in Table 2. From the results of Table 2, it was found that in Example 1, the presence ratio of the 3R crystal structure in the crystal phase was 28.5% and the crystallite size of the 3R crystal structure was 11.8 nm, resulting in the smaller friction coefficient and improved friction properties compared to those in Comparative Example 1, in which the presence ratio of the 3R crystal structure in the crystal phase was 2.9% and the crystallite size was 88.3 run. It was also found that, in Example 1, the presence ratio of the 2H crystal structure formed of crystallites of which crystallite size was 20 nm or less in the crystal phase was 71.5%, and the presence ratio of the amorphous phase in the particles was 21.3%, resulting in the further smaller friction coefficient and further improved friction property compared to those in Examples 2 and 3.

It was found that in Examples 2 and 3, the presence ratios of the 3R crystal structure in the crystal phase were 49.3% and 57.7%, respectively, and the crystallite sizes of the 3R crystal structure were 12.5 nm and 36.3 nm, respectively, resulting in the smaller friction coefficient and improved friction properties compared to those in Comparative Example 1. It was also found that in Examples 2 and 3, although the presence ratio of the 2H crystal structure formed of the crystal phase having a crystallite size of 20 nm or less and the presence ratio of the amorphous phase in the particles were smaller than those in Example 1, the presence ratio of the 3R crystal structure and the crystallite size of the 3R crystal structure increased compared to those of Example 1, resulting in obtaining an excellent friction coefficient compared to that in Comparative Example 1.

From Examples 1 to 3 and Comparative Example 1 described above, it was demonstrated that the 3R crystal structure of molybdenum disulfide particles, the crystallite size thereof, and the median diameter $D_{50}$ determined by the dynamic light scattering provided a significant effect on the friction properties. From the results of these Examples, it is considered that when the presence ratio of the 3R crystal structure of molybdenum disulfide was 20% or more and the crystallite size thereof was 1 nm or more and 50 nm or less, the presence ratio of the 3R crystal structure and the crystallite size were significantly affected, and thus the excellent friction coefficients was capable of being obtained even when the molybdenum disulfide particles having a median diameter $D_{50}$ determined by a dynamic light scattering method of more than 1,000 nm were used.

[Friction coefficient measurement and friction evaluation of lubricating compositions containing molybdenum disulfide particles and organometallic complex particles].

Example 4

To 89 parts by mass of the lubricating oil (Super Oil N32, manufactured by JXTG Nippon Oil & Energy Corporation), 10 parts by mass of the additive (Aclube 702, manufactured by Sanyo Chemical Industries, Ltd.), 0.08 part by mass of the molybdenum disulfide particles of Example 1, and 0.8 part by mass of organometallic complex particles (SAKURA-LUBE 525 (MoDTC), manufactured by ADEKA CORPORATION) were added, and the resultant mixture was subjected to ultrasonic dispersion for 1 hour to prepare lubricating composition.

Example 5

A lubricating composition was prepared in the same manner as in Example 4 except that the organometallic complex particles were not added and 0.08 part by mass of the molybdenum disulfide particles of Example 1 was added.

Comparative Example 2

A lubricating composition was prepared in the same manner as in Example 4 except that neither the molybdenum disulfide particles of Example 1 nor the organometallic complex particles were added.

Comparative Example 3

A lubricating composition was prepared in the same manner as in Example 4 except that the molybdenum disulfide particles of Example 1 were not added and 0.8 mass part of the organometallic complex particles (SAKURA-LUBE 525 (MoDTC), manufactured by ADEKA CORPORATION) were added.

The friction and wear test was performed using a rheometer testing machine (MCR-502, manufactured by Anton Paar GmbH) equipped with a temperature controllable stage dedicated for sliding property evaluation (Tribocell). Into a stage where the flat parts of three SUJ2 special stainless steel cylindrical pins were inclined 45 degrees in the height direction and the pins were evenly aligned at 120 degrees with each other in the horizontal direction when viewed from directly above, the lubricating composition prepared by the above method was poured to immerse the contact surface. From the above of the contact surface, one ½-inch SUJ2 special stainless steel ball was contacted and a predetermined load was applied in a vertical direction. After leaving to stand for 5 minutes, the stage temperature was varied from 25° C. to 100° C. to acquire the friction coefficient at each temperature. The stage temperature and the temperature of the lubricating composition are equal. Varying the stage temperature allows the temperature of the lubricating composition to be controlled. At this time, the rotation speed of the SUJ2 ball was set to 600 rpm. This lubricating composition was used as Example 4 and the friction coefficient was compared with that in Comparative Examples 2 to 4 shown in Table 3. The case where the friction coefficient was less than the friction coefficient of Comparative Example 2 was determined to be excellent "o", the best case at the same temperature was determined to be "⊚", and the case where the friction coefficient was equal to the higher than the friction coefficient of Comparative Example 2 was determined to be poor "x". Results are shown in Table 3.

TABLE 3

| | Lubricant composition [part by mass] | | | | Friction coefficient [—] | | | | Time dependency of friction coefficient |
|---|---|---|---|---|---|---|---|---|---|
| | Lubricant oil | Additive | Molybdenum disulfide particles in Example 1 | Organometallic complex particles | 25° C. | 50° C. | 75° C. | 100° C. | |
| Example 4 | 89 | 10 | 0.08 | 0.8 | ⊚ 0.0447 | ⊚ 0.0399 | ⊚ 0.0408 | ⊚ 0.0447 | ◯ |
| Example 5 | 90 | 10 | 0.08 | 0 | ◯ 0.0634 | ◯ 0.0673 | ◯ 0.0824 | ◯ 0.0846 | — |
| Comp Example 2 | 90 | 10 | 0 | 0 | — 0.0916 | — 0.0914 | — 0.097 | — 0.0959 | — |
| Comp Example 3 | 89 | 10 | 0 | 0.8 | ◯ 0.072 | ◯ 0.0623 | ◯ 0.0436 | ◯ 0.0455 | X |

From the results in Table 3, it was found that in Example 4, the lubricating composition contains both of the molybdenum disulfide particles and the organometallic complex particles, whereby the friction coefficient reduction effect of these two particles is combined to significantly reduce the friction coefficient in the temperature range of 25° C. to 100° C.

In Example 5 containing the molybdenum disulfide particles alone, the friction coefficient was possible to be reduced over the entire temperature range compared to Comparative Example 2, and in particular, the friction coefficient was significantly reduced in the temperature range of 25° C. to 50° C.

On the other hand, in Comparative Example 3 containing the organometallic complex particles alone, the friction coefficient was lower over the entire temperature range than that in Comparative Example 2, in which neither molybdenum disulfide particles nor organometallic complex particles were contained, but the friction coefficient increased particularly in the temperature range of 25° C. to 50° C. compared to that in Example 4.

Figure 12:
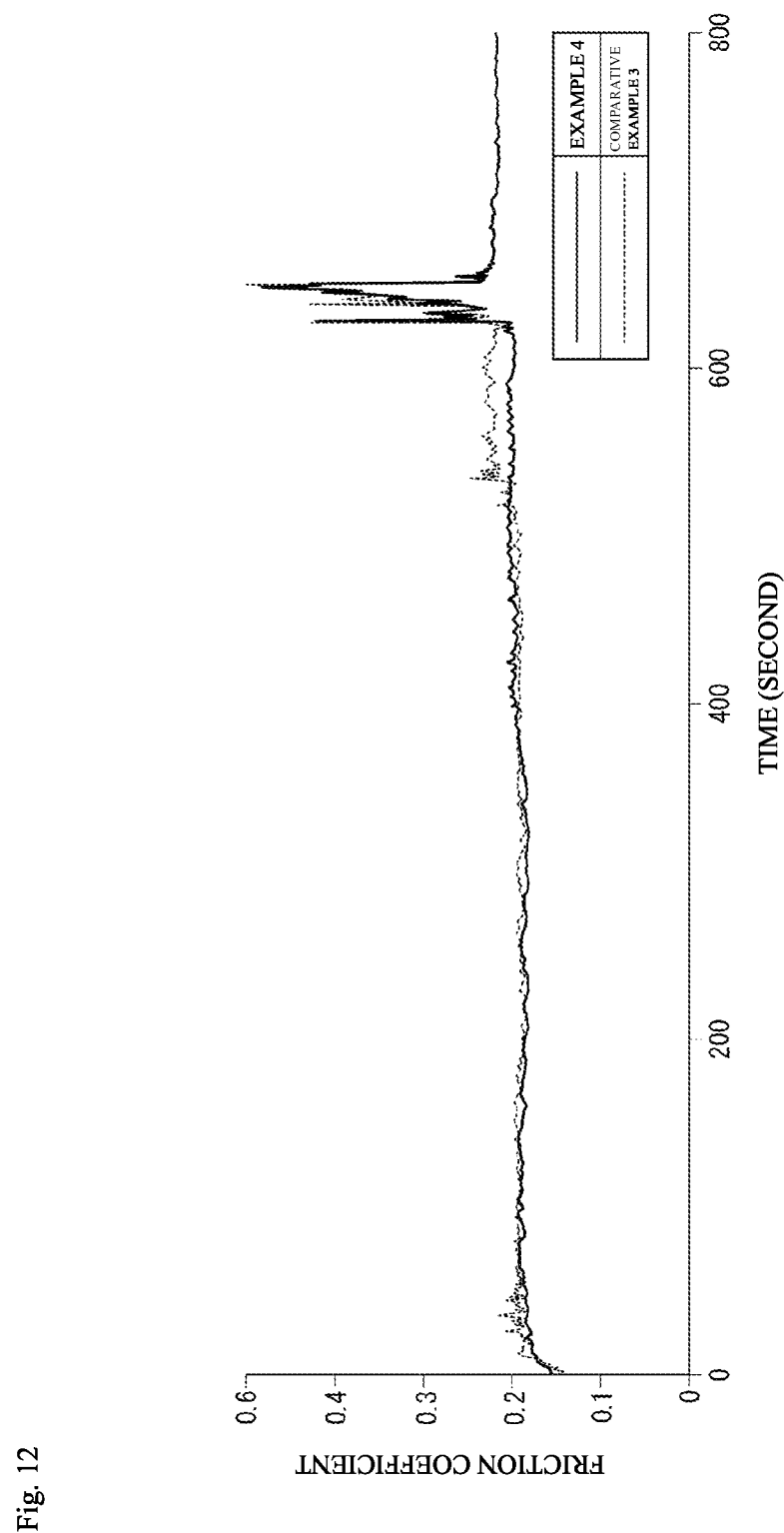
FIG. 12 is a graph illustrating the result of the measured time dependency of friction coefficients at 75° C. in Example 4 and Comparative Example 3.

Next, the results of the measured time dependency of the friction coefficient at 75° C. in, as a representative, Example 4 and Comparative Example 3 are shown in FIG. 12.

As shown in FIG. 12, in Example 4 containing both of the molybdenum disulfide particles of Example 1 and the organometallic complex particles, sludge caused by the molybdenum dialkyl dithiocarbamate (MoDTC) (SAKURA-LUBE 525, manufactured by ADEKA CORPORATION) used as the organometallic complex particles was generated after 600 seconds and the friction coefficient temporarily increased.

However, the friction coefficient was reduced by the molybdenum disulfide particles, and even after sludge generation, a low friction coefficient almost equal to the friction coefficient before sludge generation was capable of being maintained (approximately 20% increase) for a long period of more than 150 seconds. Therefore, it was found that the time dependency of the friction coefficient was excellent "O".

On the other hand, in Comparative Example 3 containing the organometallic complex particles alone, sludge caused by molybdenum dialkyl dithiocarbamate (MoDTC) (SAKURA-LUBE 525, manufactured by ADEKA CORPORATION) used as the organometallic complex particles was generated after 600 seconds and the friction coefficient increased, resulting in a high load state. Consequently, the test was not capable of being continued, and thus the time dependency of the friction coefficient was poor x.

REFERENCE SIGNS LIST

1: Production apparatus
2: Calcining furnace
3: Cooling pipe
4: Collection device
5: Discharge port
6: Opening degree adjustment damper
7: Observation window
8: Air exhauster
9: External cooling device

The invention claimed is:

1. Molybdenum disulfide particles comprising:
a 2H crystal structure and a 3R crystal structure of molybdenum disulfide, wherein
a presence ratio of the 3R crystal structure in a crystal phase of molybdenum disulfide is 10% or more, and
a crystallite size of the 3R crystal structure calculated by extended-type Rietveld analysis based on an analysis formula L=Kλ/(βcosθ) using a profile obtained from powder X-ray diffraction (XRD) using Cu-Kα rays as an X-ray source is 1 nm to 150 nm,
(in the above formula, K is an instrumental constant that depends on an XRD optical system (an incident side and a detector side) and settings, L is a crystallite size [m], λ is a measured X-ray wavelength [m], β is a half width [rad], and θ is a Bragg angle of a diffraction line [rad]).

2. The molybdenum disulfide particles according to claim 1, wherein the 3R crystal structure obtained by the extended-type Rietveld analysis is formed of a crystal phase constituted of crystallites having a crystallite size calculated in accordance with the analysis formula of 5 nm to 50 nm.

3. The molybdenum disulfide particles according to claim 1, wherein
the 2H crystal structure obtained by the extended-type Rietveld analysis is formed of a single crystalline phase constituted of crystallites having a predetermined crystallite size, and
the crystallite size of the crystal phase of the 2H crystal structure is 1 nm to 20 nm.

4. The molybdenum disulfide particles according to claim 3, wherein a presence ratio of the 2H crystal structure and the 3R crystal structure in the crystal phase obtained by the extended-type Rietveld analysis using the profile obtained from the XRD is 10:90 to 90:10.

5. The molybdenum disulfide particles according to claim 1, wherein
the 2H crystal structure obtained by the extended-type Rietveld analysis is formed of a first crystal phase constituted of crystallites having a predetermined crystallite size and a second crystal phase having a smaller crystallite size than that of the first crystal phase, and
the crystallite size of the second crystal phase of the 2H crystal structure is 1 nm to 20 nm.

6. The molybdenum disulfide particles according to claim 5, wherein a presence ratio of the first crystal phase of the 2H crystal structure, the 3R crystal structure, and the second crystal phase of the 2H crystal structure in the crystal phase obtained by the extended-type Rietveld analysis using the profile obtained from the XRD is 30 to 10:10 to 70:80 to 15.

7. The molybdenum disulfide particles according to claim 1, wherein
the molybdenum disulfide particles comprise an amorphous phase, and
a presence ratio of the amorphous phase of the molybdenum disulfide particles is 5% or more.

8. The molybdenum disulfide particles according to claim 1, wherein in a radial distribution function obtained from an extended X-ray absorption fine structure (EXAFS) profile of a K absorption edge of molybdenum, a ratio (I/II) of peak intensity I caused by Mo—S to peak intensity II caused by Mo—Mo is larger than 1.0.

9. The molybdenum disulfide particles according to claim 1, wherein a median diameter $D_{50}$ of the molybdenum disulfide particles determined by a dynamic light scattering method is 10 nm to 1,000 nm.

10. The molybdenum disulfide particles according to claim 1, wherein a specific surface area of the molybdenum disulfide particles is 10 $m^2/g$ or more measured by a BET method.

11. A lubricating composition comprising:
the molybdenum disulfide particles according to claim 1;
base oil constituted of one or more of mineral oil, synthetic oil, and partially synthetic oil; and
an additive.

12. The lubricating composition according to claim 11, wherein the lubricating composition comprises 0.0001% by mass to 10% by mass of the molybdenum disulfide particles with respect to 100% by mass of a total mass of the lubricating composition.

13. The lubricating composition according to claim 11, further comprising organometallic complex particles.

14. The lubricating composition according to claim 13, wherein the lubricating composition comprises 0.0001% by mass to er more and 10% by mass or less of the organometallic complex particles with respect to 100% by mass of a total mass of the lubricating composition.

* * * * *